US012692837B2

(12) United States Patent
Clague et al.

(10) Patent No.: US 12,692,837 B2
(45) Date of Patent: Jul. 28, 2026

(54) SYSTEMS AND METHODS FOR ASSEMBLING AND INSTALLING OFFSHORE WIND TURBINES

(71) Applicants:Friede & Goldman United B.V., Amsterdam (NL); CCCC International Holding Limited, Wanchai (HK)

(72) Inventors: Robert Edward Clague, Sugar Land, TX (US); Shannon Michael Galway, Fulshear, TX (US); Ante Lovric, Houston, TX (US); Kyle Alan Littman, East Bernard, TX (US); Ernest Gene Kamp, III, Katy, TX (US)

(73) Assignees: Friede & Goldman United B.V. (NL); CCCC International Holding Limited, Hong Kong (HK)

( * ) Notice: Subject to any disclaimer, the term of this patent is extended or adjusted under 35 U.S.C. 154(b) by 592 days.

(21) Appl. No.: 17/527,231

(22) Filed: Nov. 16, 2021

(65) Prior Publication Data

US 2022/0154695 A1     May 19, 2022

Related U.S. Application Data

(60) Provisional application No. 63/115,352, filed on Nov. 18, 2020.

(51) Int. Cl.
*F03D 13/10* (2016.01)
*B63B 27/12* (2006.01)
(Continued)

(52) U.S. Cl.
CPC .............. *F03D 13/10* (2016.05); *B63B 27/12* (2013.01); *B63B 27/16* (2013.01); *B63B 35/003* (2013.01);
(Continued)

(58) Field of Classification Search
CPC ......... F03D 13/10; F03D 13/25; B63B 27/12; B63B 27/16; B63B 35/003; B66C 23/185;
(Continued)

(56) References Cited

U.S. PATENT DOCUMENTS

| 3,273,527 | A | 9/1966 | Goldman |
| 3,572,274 | A | 3/1971 | Brauer |
| | | (Continued) | |

FOREIGN PATENT DOCUMENTS

| AU | 2021381896 | 5/2023 |
| AU | 2022268885 | 11/2023 |
| | | (Continued) |

OTHER PUBLICATIONS

Response to European Patent Office Communication pursuant to Rules 161(1) and 162 EPC filed Jan. 8, 2024 for European Application No. 21824180.0, published as EP4248089 corresponding to the present Application that was previously cited as NPL-Y in the Original Information Disclosure Statement "IDS" filed on Aug. 13, 2024 (42 pages).

(Continued)

*Primary Examiner* — Ryan J. Walters
(74) *Attorney, Agent, or Firm* — Clark Hill PLC

(57) ABSTRACT

The systems and methods for assembling and installing multiple wind turbines from a single vessel are provided. Generally, the different embodiments use wind turbine components on the vessel that include blades, a nacelle assembly having a rotating hub, and a tower. A Turbine Installation Gantry System (T.I.G.S.) embodiment uses a gantry system having a truss sub-structure and at least one bridge crane on the elevated vessel for assembling the wind turbine blades on board to the nacelle hub supported above the seabed. A Skidding Turbine Installation Crane (S.T.I.C.) embodiment has a rotatable crane mounted on a skidding pedestal or
(Continued)

cantilever structure to provide full access to the vessel deck and the blades outboard of the vessel for assembling each of the blades with the assembled nacelle assembly outboard. A Turbine Assembly and Positioning System (T.A.P.S.) embodiment includes a handling system and a crane both mounted onto a skidding cantilever structure for fastening blades to an assembled tower section and nacelle hub suspended cantilevered outboard of the vessel by the handling system. A combination embodiment uses selected components and systems from the T.I.G.S., S.T.I.C. and T.A.P.S. embodiments to provide redundancy and simultaneous movements of components and systems.

23 Claims, 19 Drawing Sheets

(51) Int. Cl.

| | | |
|---|---|---|
| *B63B 27/16* | (2006.01) | |
| *B63B 35/00* | (2020.01) | |
| *B66C 23/18* | (2006.01) | |
| *E02B 17/02* | (2006.01) | |
| *F03D 13/25* | (2016.01) | |
| *E02B 17/00* | (2006.01) | |

(52) U.S. Cl.
CPC .......... *B66C 23/185* (2013.01); *E02B 17/021* (2013.01); *F03D 13/25* (2016.05); *E02B 2017/0091* (2013.01); *F05B 2230/6102* (2013.01); *F05B 2240/95* (2013.01); *Y02E 10/727* (2013.01)

(58) Field of Classification Search
CPC .......... E02B 17/021; E02B 2017/0091; F05B 2230/6102; F05B 2240/95; F05B 2240/97; Y02E 10/727; Y02E 10/72
See application file for complete search history.

(56) References Cited

U.S. PATENT DOCUMENTS

| | | | |
|---|---|---|---|
| 4,077,350 | A | 3/1978 | Nishino et al. |
| 4,161,376 | A | 7/1979 | Armstrong |
| 4,195,950 | A | 4/1980 | Goldman |
| 4,269,543 | A | 5/1981 | Goldman et al. |
| 4,714,375 | A | 12/1987 | Stevenson et al. |
| RE32,589 | E | 2/1988 | Goldman et al. |
| 4,968,181 | A | 11/1990 | Goldman |
| 5,020,956 | A | 6/1991 | Marsden |
| 5,092,712 | A | 3/1992 | Goldman et al. |
| 5,290,128 | A | 3/1994 | Yeargain et al. |
| 5,622,452 | A | 4/1997 | Goldman |
| 5,921,714 | A | 7/1999 | Goldman |
| 6,003,463 | A | 12/1999 | Giesler |
| 6,231,269 | B1 | 5/2001 | Shear et al. |
| 6,591,770 | B1 | 7/2003 | Blackmore |
| 6,609,573 | B1 | 8/2003 | Day |
| 6,718,901 | B1 | 4/2004 | Abbott et al. |
| 6,926,097 | B1 | 8/2005 | Blake |
| 7,083,004 | B2 | 8/2006 | Roodenburg et al. |
| 7,156,586 | B2 | 1/2007 | Nim |
| 7,213,526 | B1 | 5/2007 | Hamilton |
| 7,281,902 | B2 | 10/2007 | Mortensen |
| 7,686,543 | B2 | 3/2010 | They |
| 7,735,441 | B2 | 6/2010 | Borum et al. |
| 7,815,398 | B2 | 10/2010 | Altman |
| 7,963,740 | B2 | 6/2011 | Larsen et al. |
| 8,015,865 | B2 | 9/2011 | DeFilipp |
| 8,205,568 | B2 | 6/2012 | Braun |
| 8,316,614 | B2 | 11/2012 | Soe-Jensen |
| 8,471,399 | B2 | 6/2013 | Lefranc |
| 8,585,325 | B2 | 11/2013 | Roper |

| | | | | |
|---|---|---|---|---|
| 8,613,569 | B2 * | 12/2013 | Belinsky | .................. F03D 13/10 405/209 |
| 8,622,011 | B2 | 1/2014 | Jähnig et al. | |
| 8,640,340 | B2 | 2/2014 | Foo et al. | |
| 8,823,198 | B2 | 9/2014 | De Boer | |
| 8,893,905 | B2 | 11/2014 | Stührwoldt | |
| 9,061,738 | B2 | 6/2015 | Eriksson et al. | |
| 9,080,554 | B2 | 7/2015 | Royseth | |
| 9,359,047 | B2 | 6/2016 | Steven et al. | |
| 9,410,528 | B2 | 8/2016 | Westergaard | |
| 9,533,738 | B2 | 1/2017 | Tominaga | |
| 9,567,721 | B2 | 2/2017 | Moiret | |
| 9,605,401 | B2 | 3/2017 | Salom et al. | |
| 9,643,690 | B2 | 5/2017 | Hessels | |
| 9,663,916 | B2 | 5/2017 | Denker et al. | |
| 9,670,909 | B2 | 6/2017 | Hölscher | |
| 9,815,527 | B2 | 11/2017 | Robertson et al. | |
| 9,889,908 | B2 | 2/2018 | Dekker et al. | |
| 10,253,475 | B2 | 4/2019 | Zhu et al. | |
| 10,267,293 | B2 | 4/2019 | Peiffer et al. | |
| 10,385,827 | B2 | 8/2019 | Botwright et al. | |
| 10,421,524 | B2 | 9/2019 | Cermelli et al. | |
| 10,557,314 | B2 | 2/2020 | Haavind | |
| 10,569,977 | B1 | 2/2020 | Hammer et al. | |
| 10,569,995 | B2 | 2/2020 | Roodenburg et al. | |
| 10,612,323 | B2 | 4/2020 | Childers et al. | |
| 10,626,573 | B2 | 4/2020 | Coordes et al. | |
| 10,774,813 | B2 | 9/2020 | Gomez et al. | |
| 10,851,763 | B2 | 12/2020 | Kemp et al. | |
| 10,906,785 | B2 | 2/2021 | Wingerden et al. | |
| 10,941,536 | B2 | 3/2021 | Estebanez et al. | |
| 10,968,894 | B2 | 4/2021 | Kemp et al. | |
| 10,995,464 | B2 | 5/2021 | Van Loon et al. | |
| 11,008,073 | B2 | 5/2021 | Hammer et al. | |
| 11,053,924 | B2 | 7/2021 | Langeard | |
| 11,105,062 | B2 | 8/2021 | Scholte-Wassink | |
| 11,136,206 | B2 | 10/2021 | Hammer et al. | |
| 11,142,290 | B2 | 10/2021 | Stroo | |
| 11,161,571 | B2 | 11/2021 | Hammer et al. | |
| 11,168,666 | B1 | 11/2021 | van Loon | |
| 11,236,727 | B2 | 2/2022 | Brohm et al. | |
| 11,795,647 | B2 | 10/2023 | Oltmann | |
| 11,975,804 | B2 | 5/2024 | Oltmann | |
| 12,000,378 | B2 | 6/2024 | Brohm et al. | |
| 2006/0120809 | A1 | 6/2006 | Ingram et al. | |
| 2009/0217852 | A1 | 9/2009 | Zaman | |
| 2010/0067989 | A1 | 3/2010 | Brown et al. | |
| 2010/0293781 | A1 | 11/2010 | Foo et al. | |
| 2010/0316450 | A1 | 12/2010 | Botwright | |
| 2011/0292760 | A1 | 12/2011 | Hayes | |
| 2011/0311360 | A1 | 12/2011 | Nedrebø | |
| 2012/0141233 | A1 | 6/2012 | Mueller | |
| 2012/0189390 | A1 * | 7/2012 | Belinsky | .................. F03D 13/10 405/209 |
| 2012/0255478 | A1 | 10/2012 | Hadeler et al. | |
| 2013/0298485 | A1 | 11/2013 | Li et al. | |
| 2013/0302096 | A1 | 11/2013 | Tsouroukdissian et al. | |
| 2014/0366792 | A1 | 12/2014 | Steven et al. | |
| 2015/0082720 | A1 | 3/2015 | Tsouroukdissian et al. | |
| 2016/0169209 | A1 | 6/2016 | Coordes et al. | |
| 2018/0195250 | A1 | 7/2018 | Nelson | |
| 2019/0345011 | A1 | 11/2019 | Van Wingerden et al. | |
| 2020/0022341 | A1 | 1/2020 | Li et al. | |
| 2020/0200150 | A1 | 6/2020 | Langeard | |
| 2021/0017727 | A1 | 1/2021 | Van Loon et al. | |
| 2021/0047006 | A1 | 2/2021 | Oltmann | |
| 2021/0190043 | A1 | 6/2021 | Kemp et al. | |
| 2021/0371219 | A1 | 12/2021 | Hammer et al. | |
| 2022/0074160 | A1 | 3/2022 | Zhu et al. | |
| 2022/0112881 | A1 | 4/2022 | Brohm et al. | |
| 2022/0154695 | A1 | 5/2022 | Clague et al. | |
| 2022/0259811 | A1 | 8/2022 | Van Loon et al. | |
| 2022/0355907 | A1 | 11/2022 | Lovric et al. | |

FOREIGN PATENT DOCUMENTS

| | | | |
|---|---|---|---|
| CN | 105460796 | A | 4/2016 |
| CN | 107738730 | A | 2/2018 |
| CN | 209492672 | U | 10/2019 |

(56)            References Cited

FOREIGN PATENT DOCUMENTS

| | | | |
|---|---|---|---|
| CN | 110886684 | A | 3/2020 |
| CN | 116457571 | A | 7/2023 |
| CN | 117242223 | A | 12/2023 |
| DE | 3224976 | A1 | 1/1984 |
| DE | 29908897 | U1 | 8/1999 |
| DE | 10306225 | A1 | 9/2004 |
| DE | 202009006507 | U1 | 8/2009 |
| DE | 202009007141 | U1 | 8/2009 |
| DE | 102010040887 | A1 | 3/2012 |
| DE | 102018105545 | A1 | 9/2019 |
| DK | 2931978 | T3 | 5/2017 |
| EP | 0761964 | A1 | 3/1997 |
| EP | 1169570 | B1 | 1/2002 |
| EP | 1876093 | A1 | 1/2008 |
| EP | 2327838 | A2 | 6/2011 |
| EP | 2436593 | A1 | 4/2012 |
| EP | 2602177 | A1 | 6/2013 |
| EP | 2641825 | A1 | 9/2013 |
| EP | 2473400 | B1 | 6/2015 |
| EP | 2641825 | B1 | 3/2016 |
| EP | 2931978 | B8 | 2/2017 |
| EP | 3388664 | A1 | 10/2018 |
| EP | 2475879 | B1 | 5/2019 |
| EP | 3575199 | B1 | 12/2019 |
| EP | 3693515 | A1 | 8/2020 |
| EP | 4248089 | | 9/2023 |
| EP | 21824180.0 | | 9/2023 |
| EP | 23718070.8 | A1 | 10/2023 |
| EP | 4334535 | | 3/2024 |
| FR | 2760229 | A1 | 9/1998 |
| FR | 3072643 | A1 | 4/2019 |
| GB | 2365905 | B | 5/2003 |
| GB | 2402109 | A | 12/2004 |
| JP | 2004218436 | A | 8/2004 |
| JP | 2023549580 | | 11/2023 |
| JP | 2024517828 | | 4/2024 |
| JP | 7787194 | B2 | 12/2025 |
| KR | 20110139921 | A | 12/2011 |
| KR | 101315154 | B1 | 10/2013 |
| KR | 101444326 | B1 | 4/2014 |
| KR | 20150021657 | A | 3/2015 |
| KR | 101556194 | B1 | 5/2015 |
| KR | 101774854 | B1 | 9/2017 |
| KR | 101864144 | B1 | 9/2017 |
| KR | 101864145 | B1 | 9/2017 |
| KR | 20170107628 | A | 9/2017 |
| KR | 101985257 | B1 | 6/2019 |
| KR | 102134996 | B1 | 7/2020 |
| KR | 1020230106684 | | 7/2023 |
| KR | 1020240004955 | | 1/2024 |
| NL | 1042866 | B1 | 11/2019 |
| NL | 2021025 | B1 | 12/2019 |
| NL | 2022553 | B1 | 8/2020 |
| NL | 2031544 | B1 | 11/2023 |
| NL | 2033624 | B1 | 6/2024 |
| NL | 2034330 | B1 | 9/2024 |
| NL | 2034761 | B1 | 11/2024 |
| NL | 2035480 | B1 | 2/2025 |
| VN | 98491 | A | 10/2023 |
| VN | 1202307210 | | 10/2023 |
| WO | WO 02073032 | A1 | 9/2002 |
| WO | WO 2002088475 | A1 | 11/2002 |
| WO | 2003093584 | A1 | 11/2003 |
| WO | WO 2007009464 | A1 | 1/2007 |
| WO | WO 2010026555 | A2 | 3/2010 |
| WO | WO 2011065840 | A2 | 6/2011 |
| WO | WO 2012039619 | A2 | 3/2012 |
| WO | WO 2012060112 | A1 | 5/2012 |
| WO | WO 2012066789 | A1 | 5/2012 |
| WO | 2014011057 | A1 | 1/2014 |
| WO | WO 2014019920 | A1 | 2/2014 |
| WO | 2014092555 | A1 | 6/2014 |
| WO | WO 2015088333 | A1 | 6/2015 |
| WO | WO 2016209720 | A1 | 12/2016 |
| WO | WO 2017141177 | A1 | 8/2017 |
| WO | WO 2019102434 | A1 | 5/2019 |
| WO | WO 2019103611 | A2 | 5/2019 |
| WO | WO 2019143282 | A1 | 7/2019 |
| WO | WO 2019241125 | A1 | 12/2019 |
| WO | WO2019245366 | A1 | 12/2019 |
| WO | WO 2020085902 | A1 | 4/2020 |
| WO | WO 2020167137 | A1 | 8/2020 |
| WO | WO 2022108889 | A1 | 5/2022 |
| WO | WO 2022108889 | A8 | 5/2022 |
| WO | WO 2022235508 | A2 | 11/2022 |
| WO | WO 2022235508 | A3 | 11/2022 |
| WO | WO 2023195855 | A1 | 10/2023 |
| WO | 2024189076 | A1 | 9/2024 |
| WO | 2025021954 | A1 | 1/2025 |

OTHER PUBLICATIONS

Temporary Works Design "TWD", capture of TWD's Post on Linkedin that states to be from 2 weeks ago when captured on Apr. 23, 2025 at: https://www.linkedin.com/posts/temporary-works-design_offshoreinnovation-offshorewind-windeurope2025-activity-7313837699306582017-_IMY?utm_source=share&utm_medium=member_desktop&rcm=ACoAAAF6IVABnn1_MZOgKkP2kRcJeJxWE0ZGGbl about the "Motion-Compensated Lifting Tool" containing a video of concept (3 pages).

PCT International Preliminary Report on Patentability "IPRP" issued Oct. 10, 2024 to PCT International Publication No. WO2023195855A1 for Applicant Penthus Holding B.V. that was previously cited in the Original IDS filed on Aug. 13, 2024 along with the Jul. 10, 2023 PCT Written Opinion "WO" of the International Searching Authority "ISA" (11 pages).

PCT International Search Report "ISR" issued Jul. 10, 2023 corresponding to PCT International Publication No. WO2023195855A1 for Applicant Penthus Holding B.V. that was previously cited in the Original IDS filed on Aug. 13, 2024 (3 pages).

Response to the Jul. 10, 2023 Written Opinion "WO" of the International Searching Authority "ISA" (see NPLs "3" and "4" cited herein) with amended claims dated Oct. 17, 2024, corresponding to European Application No. EP 23718070.8 A1 cited herein and PCT International Publication No. WO 2023195855 A1 for Applicant Penthus Holding B.V. that was previously cited in the Original IDS filed Aug. 13, 2024 (12 pages).

Request for Substantive Examination and Request to Delay Examination by 3 years dated Nov. 16, 2023 for the corresponding Chinese Patent Application No. 202180077260.7. Chinese Patent Application No. 202180077260.7 was previously cited in the Original IDS filed on Aug. 13, 2024 (3 pages).

Request for Examination of Application dated Nov. 15, 2024 for the corresponding Japanese Patent Application No. 2023-553163. Japanese Patent Application No. 2023-553163 was previously cited in the Original IDS filed on Aug. 13, 2024 (25 pages).

Request for Voluntary Amendment dated Oct. 29, 2024 for the corresponding Vietnamese Patent Application No. 1-2023-03867. Vietnamese Patent Application No. 1-2023-03867 was previously cited in the Original IDS filed on Aug. 13, 2024 (89 pages).

Written Request for Examination and Amendment to Specification, ETC. dated Nov. 15, 2024 for the corresponding South Korean Application No. 10-2023-7020246. South Korean Application No. 10-2023-7020246 was previously cited in the Original IDS filed on Aug. 13, 2024 (25 pages).

Response filed on Jul. 2, 2025 to the European Patent Office Communication pursuant to Rule 71(3) EPC dated May 7, 2025 (previously cited as NPL-1 in the 3rd Supplemental IDS filed on May 14, 2025) in the corresponding European Application No. 21824180.0, published as EP4248089. The European Application No. 21824180.0 was previously cited in the Original IDS filed on Aug. 13, 2024 (88 pages).

Hasan Bagbanci, "Dynamic Analysis of Offshore Floating Wind Turbines", Centre for Marine Technology and Engineering (CENTEC), Jan. 12, 2006, See Abstract, p. 6 and Figure 16a, Instituto Superior Tecnico Technical University of Lisbon, Lisboa, Portugal (9 pages).

Emily Balogh, "Deepwater Offshore Wind Power Generation Using Oil and Gas Platform Technology", Dec. 18, 2008, See p. 1,

(56) References Cited

OTHER PUBLICATIONS

Renewable Energy World.com, https://www.renewableenergyworld.com/baseload/deepwater-offshore-wind-power-generation-using-oil-and-gas-platform-technology-54314/#gref (6 pages).

G.R. Fulton, D.J. Malcolm, H. Elwany, W. Stewart, E. Moroz, and H. Dempster, "Semi-Submersible Platform and Anchor Foundation Systems for Wind Turbine Support", p. 2 and Figures 1-2, National Renewable Energy Laboratory (NREL), Concept Marine Associates Inc., www.nrel.gov/docs/fy08osti/40282.pdf, Long Beach, California (141 pages).

F. Sevilla, R. Redfern, A. Storey, N. Baldock, "Optimization of Installation, Operation and Maintenance at Offshore Wind Projects in the U.S.", Dec. 19, 2014, See p. 60 and Table 3-3, Garrad Hassan, www.osti.gov/servlets/purl/1333103 (305 pages).

"Offshore Wind Installation", Oct. 12, 2020, See p. 4 and Figures 1 and 2, Van Oord Marine Ingenuity, www.vanoord.com/activities/offshore-woind-equipment (7 pages).

"From Oil and Gass to Offshore Wind", May 2, 2019, See p. 12 and Figure 1, Ulstein, www.ulstein.com/blog/2019/getting-the-best-from-oil-and-gas-to-offshore-renewables (17 pages).

"Scientists Race to Develop Floating Wind Farms", Jan. 23, 2013, See Paragraphs 1-3 and Figure 2, Deutsche Welle, https://www.dw.com/en/scientists-race-to-develop-floating-wind-farms/a-16540081 (3 pages).

Elize De Vries, "Twin rotors bring 15MW offshore turbine closer", May 30, 2017, See Paragraphs 1-5 and Figure 1, Wind Power Monthly, https://www.windpowermonthly.com/article/1434240/twin-rotors-bring-15mw-offshore-turbine-closer (13 pages).

Elaine Maslin, "Bigger, Bolder, Heavier", Jun. 17, 2019, See p. 8, Offshore Engineer, https://www.oedigital.com/news/467364-bigger-bolder-heavier (10 pages).

PCT Notification of Transmittal of the International Search Report mailed Mar. 11, 2022 issued to corresponding PCT Application No. PCT/US2021/059437; (5 pages).

PCT Notification of Transmittal of the Written Opinion mailed Mar. 11, 2022 issued to corresponding PCT Application No. PCT/US2021/059437; (8 pages).

U.S. Department of Homeland Security / U.S. Customs and Boarder Protection Feb. 4, 2021 decision about Coastwise Transportation; Outer Continental Shelf; Wind Turbines; 46 U.S.C. §§ 55102 and 55103; 19 CFR §§ 4.80a and 4.80b; 43 U.S.C. § 1333; Disclosed in the Background of the Invention for U.S. Appl. No. 17/733,062, U.S. Appl. No. 17/733,062, and PCT Publication No. WO 2022/235508 A1 all cited herein (7 pages).

"Keppel to Build Wind Turbine Installation Vessel in the U.S. Worth About S$600m"; www.kepcorp.com; Disclosed in the Background of the Invention for U.S. Appl. No. 17/733,062, U.S. Appl. No. 17/733,062, and PCT Publication No. WO 2022/235508 A1 all cited herein, Dec. 17, 2020; (2 pages).

PCT Notification of Transmittal of the International Search Report mailed Jan. 12, 2023 issued to corresponding PCT Application No. PCT/US2022/026956; (8 pages).

PCT Notification of Transmittal of the Written Opinion mailed Jan. 12, 2023 issued to corresponding PCT Application No. PCT/US202/026956; (15 pages).

Mike Schuler, "Keel Laid for First Jones Act-Compliant Offshore Wind Installation Vessel", Dec. 16, 2020, GCaptain, https://gcaptain.com/keel-laid-for-first-jones-act-compliant-offshore-wind-installation-vessel/ (5 pages).

"Keppel to build vessel in US worth $600m; more bondholders accede to Floatel lock-up", Dec. 17, 2020, The Straits Times, https://www.straitstimes.com/business/companies-markets/keppel-to-build-vessel-in-us-worth-600m-more-bondholders-accede-to (4 pages).

"Keel laying first Jones Act compliant offshore wind turbine installation vessel", Dec. 17, 2020, Ocean Energy Resources International, https://ocean-energyresources.com/2020/12/17/keel-laying-first-jones-act-compliant-offshore-wind-turbine-installation-vessel/ (3 pages).

Roy Tran, "Keppel to build wind turbine installation vessel in the U.S. worth about S$600m", Dec. 17, 2020, Keppel Ltd., https://www.keppel.com/en/media/media-releases-sgx-filings/keppel-to-build-wind-turbine-installation-vessel-in-the-us-worth-about-s600m/ (3 pages).

Adnan Memija, "US Company Reveals Jones Act-Compliant Offshore Wind Farm Installation Solution", Jul. 5, 2022, OffshoreWIND.biz, https://www.offshorewind.biz/2022/07/05/us-company-reveals-jones-act-compliant-offshore-wind-farm-installation-solution/ (.

Adnan Memija, "C-Job Design for Bleutec Foundation Installation Vessel", Aug. 31, 2022, OffshoreWIND.biz, https://www.offshorewind.biz/2022/08/31/c-job-design-for-bleutec-foundation-installation-vessel/ (3 pages).

"Belutec Industries Develops ""Can-Do"" Solution for US Offshore Wind—Integrated Transportation and Installation, Commissioning and Operations & Maintenance Solution", Jul. 5, 2022, WorkBoat 365.

Mike Schuler, "Bleutec Advances Plans for Jones Act-Compliant Offshore Wind Turbine Installation Concept", Dec. 1, 2022, GCaptain, https://gcaptain.com/bluetec-advances-plans-for-jones-act-compliant-platform-for-offshore-wind-turbine-installation/ (5 pages).

European Patent Office Communication pursuant to Rules 161(1) and 162 EPC dated Jun. 27, 2023 issued to corresponding European Application No. 21824180.0 (3 pages).

Response to European Patent Office Communication pursuant to Rules 161(1) and 162 EPC filed Jan. 8, 2024 to corresponding European Application No. 21824180.0 (41 pages).

European Patent Office Communication pursuant to Rules 161(1) and 162 EPC dated Dec. 13, 2023 issued to corresponding European Application No. 22724340.9 (3 pages).

United States Customs Service, U.S. Department of Homeland Security, RE: Coastwise Transportation; HQ H309672 (Customs), 2020 WL 4583530, Wind Turbines; 46 U.S.C. §55102; 46 U.S.C. §55103; 19 C.F.R. §4.80a; 19 C.F.R. §4.80b., Disclosed in the Background of the Invention for U.S. Appl. No. 17/733,062, U.S. Appl. No. 17/733,062, and PCT Publication No. WO 2022/235508 A1 all cited herein, Jul. 15, 2020 (5 pages).

United States Customs Service, U.S. Department of Homeland Security, RE: Revocation of Ruling Letter HQ H309672 (Jul. 15, 2020), HQ H312773 (Customs), 2020 WL 4783788, VES-3-02-OT:RR:BSTC:CCR H312773 AMW, Aug. 3, 2020, Disclosed in the Background of the Invention for U.S. Appl. No. 17/733,062, U.S. Appl. No. 17/733,062, and PCT Publication No. WO 2022/235508 A1 all cited herein (1 page).

Mike Robinson, Walt Musial, National Wind Technology Center, National Renewable Energy Laboratory, "Offshore Wind Technology Overview", U.S. Department of Energy—Energy Efficiency and Renewable Energy, Oct. 2006, (24 pages).

W. Musial, S. Butterfield, and A. Boone, "Feasibility of Floating Platform Systems for Wind Turbines", National Renewable Energy Laboratory, Conference Paper to be presented at the 23rd ASME Wind Energy Symposium, Reno, Nevada, Jan. 5-8, 2004, (14 pages).

N. Barltrop, "Multiple Unit Floating Offshore Wind Farm (MUFOW)", Paper presented at the BWEA/DTI/Multi-Science Workshop on Offshore Wind Energy, Harwell, Jun. 1993, (6 pages).

EnerOcean webpage for W2Power, www.enerocean.com/w2power/ captured May 23, 2024 (3 pages).

Response to European Patent Office Communication pursuant to Rules 161(1) and 162 EPC filed Jun. 13, 2024 to corresponding European Application No. 22724340.9 (our matter No. 471032EP) (27 pages).

Svein B. Hellesmark and Per Gunnar Andersen, Hiload Lng As; Tord Broms Thorsen, Sevan Marine Asa, "Development and Qualification of a Tandem FLNG Loading Terminal for Conventional LNG Carriers", Offshore Technology Conference, Houston, Texas, OTC-25980-MS, May 4-7, 2015, Copyright 2015, in particular, see numbered pp. 9, 10, 16, and 24 and Figures 2, 7, and 19 (24 pages).

M. Cahay, S. Paquet, E. Auburtin, and B. A. Roberts, Technip; Captain F. Olsen, Teekay, T.B. Thorsen, Sevan-Marine, P.B. Korneliussen, Kongsberg, A. Voogt, Marin, "Operational Simulations of Safe LNG Offloading to Conventional LNG Carriers in Severe Open Sea Environments", Offshore Technology Conference, Houston, Texas,

(56)     References Cited

OTHER PUBLICATIONS

OTC-27119-MS, May 2-5, 2016, Copyright 2016, in particular, see numbered pp. 4 and 5 and Figure 2 (17 pages).

Bouygues Construction, "Nouvelle Route du Littoral_1ère pile en mer", Apr. 4, 2025 capture of web page containing video of a Zourite vessel https://www.youtube.com/watch?v=jquMP5e58Dc, Jan. 5, 2017, YouTube, Internet (2 pages total).

Stogda Ship Design & Engineering (Designer of Zourite vessel in NPLs-1, 3, and 4), "Jack-Up Vessels", Apr. 4, 2025 capture of a web page from StoGda Ship Design & Engineering's website https://www.stogda.pl/offer/jack-up-vessels/, where "Heavy Lift Jack-Up Barge "Zourite" is the 3rd Project listed (p. 2 of 11 of NPL-2) of Jack-Up Vessels along with 7 captures of photographs of the Zourite vessel after clicking on "Gallery" on NPL p. 2 of 11 (pp. 3-9 of 11 of NPL-2), a capture of a photograph after clicking on" Read.

Crist S.A. (Builder of the Zourite vessel in NPLs-1, 2, and 4), "Special Projects", Apr. 4, 2025 capture of web page from Crist S.A.'s website https://crist.com.pl/en/special-projects, See numbered p. 6 of 6 for NB105 Zourite stating delivered in 2016, Internet (7 pages total).

Vinci Construction Grands Projets (Owner of the Zourite vessel in NPLs-1, 2, and 3), "New CoastalRoad Saint-Denis-La Grande Chaloupe", Apr. 4, 2025 capture of web page from Vinci Construction Grands Projets' website https://www.vinci-construction-projets.com/en/realisations/new-coastal-road/ (pp. 2-5 of 11 of NPL-4), including Apr. 4, 2025 captures of first page of web page to include all 7 photographs available in the Background by toggling the arrows (pp. 6-11 of 11 of NPL-4), Internet (11 pages total).

Lars A. Olson. U.S. Patent and Trademark Office Non-Final Office Action, dated Jan. 16, 2025 for U.S. Appl. No. 17/733,062 (39 pages).

European Patent Office Communication pursuant to Rule 71(3) EPC dated May 7, 2025 issued in the corresponding European Application No. 21824180.0, published as EP4248089 that was cited in the Original IDS filed on Aug. 13, 2024 (70 pages with cover sheet).

European Patent Office "2nd" Communication under Rule 71(3) EPC dated Jul. 17, 2025 with an Intent to Grant with its Text of the EPO approved Specification (with its 15 claims) that was issued in the corresponding European Application No. 21824180.0, published as EP4248089. The European Application No. 21824180.0, published EP4248089, and its EP prosecution were cited in the Original IDS filed on Aug. 13, 2024—see NPLs X and Y, the 3rd Supplemental IDS filed on May 14, 2025—see NPL 1, and the 4th Supplemental IDS filed.

European Patent Office "3rd" Communication under Rule 71(3) EPC dated Nov. 27, 2025 for an Intention to Grant with its Text of the EPO approved Specification (with its 15 claims) that was issued in the corresponding European Application No. 21824180.0, published as EP4248089. The European Application No. 21824180.0, published EP4248089, and its EP prosecution were cited in the Original IDS filed on Aug. 13, 2024—see NPLs X and Y, the 3rd Supplemental IDS filed on May 14, 2025—see NPL 1, the 4th.

Intellectual Property Office of Vietnam, Ministry of Science and Technology, Office Action No. 141180/SHTT-SC.ip dated Sep. 16, 2025 and digitally signed Sep. 24, 2025 (see top of 1st page of Vietnamese version) as the effective date for corresponding Vietnamese Patent Application No. 1-2023-03867. The Vietnamese Patent Application No. 1-2023-03867, published as 98491 A, was cited in the Original IDS filed on Aug. 13, 2024. All the references relied on by the Vietnamese Patent Examiner were submitted in the Original IDS.

Response to European Patent Office "EPO" Communication under Rule 71(3) dated Nov. 17, 2025, that includes Amended Claims for corresponding European Patent Application No. EP21824180.0. The "2nd" EPO Communication under Rule 71(3) EPC dated Jul. 17, 2025 was cited as "NPL 1" in the 5th Supplemental IDS filed on Jul. 30, 2025. The European Patent Application No. EP21824180.0 was cited in the Original IDS filed on Aug. 13, 2024 as European Publication No. EP 4248089. (22 pages with cover sheet).

Japanese Patent Office Decision to Grant a Patent drafted Oct. 24, 2025 and certified on Oct. 27, 2025 as the effective date for corresponding Japanese Patent Application No. 2023-553163. Japanese Patent Application No. 2023-553163 was cited in the Original IDS filed on Aug. 13, 2024 as Japanese Publication No. 2023-549580. In this Decision to Grant, the Japanese Patent Examiner cited, but did not rely on, U.S. Publication No. 2010/0293781 A1 issued as U.S. Pat. No. 8,640,340 B2, and PCT Publication No. WO 2003/093584.

Applicants' Response to European Patent Office 3rd Communication under Rule 71(3) EPC dated Nov. 27, 2025, filed on Mar. 16, 2026, accepting the Text of the EPO approved Specification (with its 15 claims) that was issued in the counterpart European Application No. 21824180.0, published as EP4248089, paying the Grant fees, and filing the French and German translations of the 15 claims. The EPO approved 15 claims in English are attached from the European Patent Office 3rd Communication under Rule 71(3) EPC dated November.

Applicants' Response filed on Mar. 19, 2026, to the Intellectual Property Office of Vietnam, Office Action No. 1411807 SHTT-SC.ip dated Sep. 16, 2025, but digitally signed Sep. 24, 2025, for counterpart Vietnamese Patent Application No. 1-2023-03867. The Vietnamese Office Action, digitally signed Sep. 24, 2025, was cited as NPL 1 in the 6th Supplemental IDS filed on Nov. 26, 2025. The Vietnamese Patent Application No. 1-2023-03867, published as 98491 A, was cited in the Original IDS filed on Aug. 13, 2024. All.

* cited by examiner

SYSTEMS AND METHODS FOR ASSEMBLING AND INSTALLING OFFSHORE WIND TURBINES

This application claims the benefit of U.S. Provisional Application No. 63/115,352 filed Nov. 18, 2020, which application is hereby incorporated by reference for all purposes in its entirety.

BACKGROUND OF THE INVENTION

This invention generally relates to assembly and installation of offshore wind turbines from a vessel. Generally, offshore wind turbines include the components of a column/ tower, a nacelle having a hub and a plurality of blades. The industry presently uses large lattice boom cranes for assembly and installation of wind turbines from a vessel. These large lattice boom cranes are very expensive, heavy, have large footprints requiring significant vessel real estate, and have experienced failures in the past. These lattice boom cranes need to be supported by large, heavy, and expensive vessels. Some examples of large lattice boom cranes are available from Seatrax, Inc. of Houston, Texas; EBI of Braithwaite, Louisiana; M.E.P. Pellegrini Marine Equipments of Verona, Italy; NOV of Schiedam, Netherlands; Liebherr of Amersfoort, Netherlands; Huisman of Schiedam, Netherlands; and Tetrahedron of Rotterdam, Netherlands. While large leg encircling lattice boom cranes are not excluded from the present invention, as will be discussed in detail below, the invention focuses on other means for assembling and installing one or more bottom supported offshore wind turbines and turbine components from a vessel.

Examples of systems and methods for assembly and installing are as follows:

U.S. Pat. No. 8,316,614 B2 proposes a method for establishing a wind turbine on a foundation where at least a part of the wind turbine rotor is attached to a wind turbine tower. Further, the method proposes the steps of positioning the wind turbine tower including the attached wind turbine rotor on the foundation, elevating a wind turbine nacelle to a use position on the tower, and directly or indirectly connecting the nacelle to the attached wind turbine rotor. The '614 patent also proposes to transport a wind turbine tower, and a vessel for transporting the wind turbine tower.

U.S. Pat. No. 8,640,340 B2 proposes installation vessels and methods for offshore wind turbine installation. In one embodiment, a cantilever mast proposes to transfer wind turbine components from an installation vessel to an offshore installation site and guide the transfer to mitigate undesired swinging movements of the wind turbine components. In another embodiment, a main crane is proposed, in cooperation with a guide arm, to transfer and guide wind turbine components from an installation vessel to an offshore installation site.

U.S. Pat. No. 9,061,738 B2 proposes a travelling crane arrangement on a floating vessel having a deck and a pair of substantially parallel tracks. The crane arrangement is proposed to have a pair of uprights configured to move along the respective tracks. In addition, the travelling crane arrangement is proposed to have a transverse beam extending between the uprights across the deck of the vessel in spaced relation thereto. Further, the travelling crane arrangement is proposed to have a trolley configured to move along the transverse beam. The trolley is proposed to carry at least part of a lifting mechanism configured to lift a load above the vessel deck. Still further, the traveling crane arrangement proposes a support selectively positionable in a brace position extending between the vessel deck and the trolley. In the brace position, the support is proposed to at least partially support the transverse beam in compression during use of the lifting mechanism to lift or otherwise support the weight of a load.

U.S. Pat. No. 9,889,908 B2 proposes a skidding system for an offshore installation or vessel, such as an offshore wind turbine installation ship, comprising at least one set of rails, and one or more carriages for supporting loads and moving loads along the rails, e.g. between a storage position and an operating position. At least one of the carriages is proposed to be adaptable to different loads.

Patent Publication No. WO2010/026555 A2 proposes a vessel having the capability of storing, transporting and installing between one and ten wind turbines. Such a vessel is proposed to have a hull having a hull periphery. The vessel further proposes at least two rear jack-up legs and at least one forward jack-up leg, movably attached to the hull. A jacking mechanism is proposed to be connected to each of the jack-up legs for elevating and lowering each jack-up leg relative to the hull between elevated and lowered positions. The vessel also proposes at least two rear azimuthing thrusters affixed to a lower side of the transom along with at least one front azimuthing thruster affixed to a lower side of the bow. The vessel further proposes at least four, preferably at least six, wind turbine column foundations, and at least two wind turbine blade brackets individually mounted to the side of the transport vessel.

Patent Publication No. WO 2019/103611 A2 proposes a method for installation of a pylon section of an offshore wind turbine with a jack-up vessel. The vessel proposes a pylon section installation track and an associated track cart that enables guiding the foot end of a pylon section, before lifting or during upending of the pylon section, over the deck of the vessel. The guide system proposes moving the pylon section without the need of a crane or with a reduced number of cranes. Thus the process proposes to be performed in less time and/or with a reduced number of cranes or with smaller cranes in the process to allow for a reduction in costs.

U.S. Pat. Nos. 8,316,614 B2; 8,640,340 B2; 9,061,738 B2; and 9,889,908 B2 and Patent Publications Nos. WO 2010/026555 A2 and WO 2019/103611 A2 are incorporated herein for all purposes.

Generally, a Wind Turbine Installation (WTI) assembly is comprised of a tower, a nacelle having a hub, and a plurality of blades. The tower is typically in one or more sections. The nacelle houses electrical and mechanical equipment necessary for the operation of the WTI. The hub is the rotating mechanism that allows attachment of the plurality of blades. Generally, a nacelle assembly is the combination of the nacelle having a hub.

SUMMARY OF THE INVENTION

The disclosed embodiments provide improved systems and methods for wind turbine assembly and installation from a vessel. The disclosure embodiments yield safer, more economical, more streamlined, and superior systems and methods. While the disclosed embodiments are not limited to self-elevating vessels or jack up rigs, such vessels are capable of advantageously elevating to different heights which improves effectiveness of assembling the single or multiple tower sections, a nacelle assembly on the upper tower section and the plurality of blades to the hub of the nacelle assembly.

BRIEF DESCRIPTION OF THE SEVERAL VIEWS OF THE DRAWINGS

So that the manner in which the above recited features of the present inventions can be understood in detail, a more particular description of the inventions, briefly summarized above, may be had by reference to the disclosed embodiments, some of which are illustrated in the appended drawings. It is to be noted, however, that the appended drawings herein illustrate only typical embodiments of these inventions and are therefore not to be considered limiting of their scope, for the inventions may be used in other equally effective embodiments.

TURBINE INSTALLATION GANTRY SYSTEM (T.I.G.S.) EMBODIMENT

Detailed Description

Figure 1:
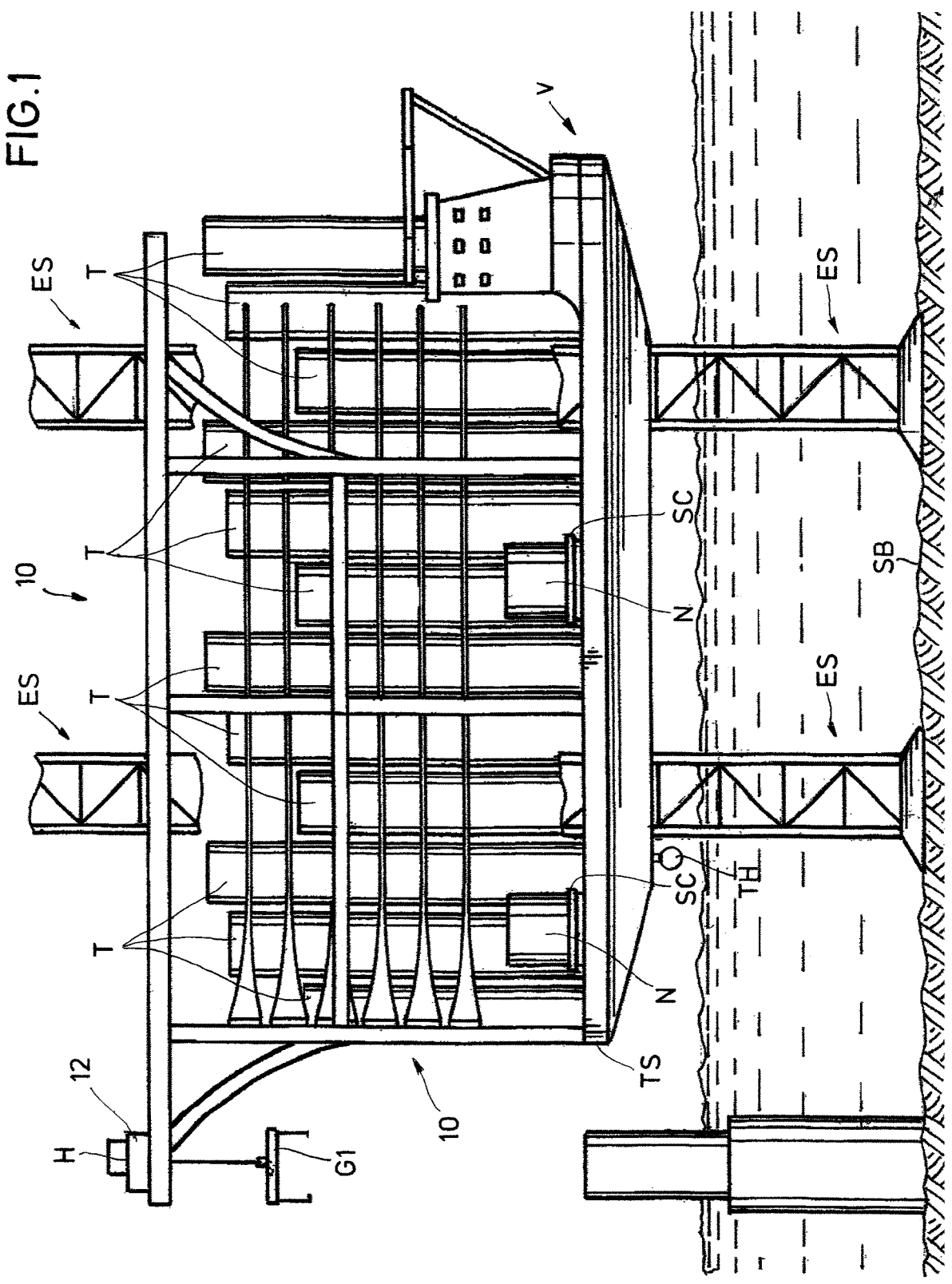
FIG. 1 is a side elevational view of the Turbine Installation Gantry System (T.I.G.S.) embodiment of the present invention configured with a self-leveling jack-up vessel shown elevated above the seabed and the water surface with 2 of the jack-up vessel legs shown broken away and further illustrating the bridge crane hoist moveable along the gantry structure parallel to the centerline of the vessel.

The Turbine Installation Gantry System (T.I.G.S.) embodiment, shown in FIGS. 1 to 4B, delivers a safe, streamlined method of installing bottom supported offshore wind turbines. As best shown in FIGS. 1 and 2, a gantry system, generally indicated at 10, comprises of a large truss substructure supporting one or multiple bridge crane(s) 12 mounted to a vessel, generally indicated at V. The substructure extends along substantially the full length of the vessel V, cantilevers over the transom TS, and serves as a runway for the bridge crane 12. The gantry system 10 has sufficient capacity and structural stability to lift, rotate, move, assemble and install large offshore wind turbines. As used herein, "assemble" is the action or process of fitting together the component parts and "install" is the action or process of placing or fixing equipment in position ready for use. The wind turbine towers T (in one or multiple sections) are releasably stored or stowed along the vessel V longitudinal centerline C with and in suitable secure hold down devices. Nacelle assemblies N are releasably stowed on skidding carts SC. Blades B are releasably stored longitudinally. The wind turbine can be fully assembled onboard the vessel V or assembled with the seabed bottom supported turbine foundation, where appropriate, using industry standard assembly and installation tools and practices. This present system and method provides a more cost effective, faster, and safer alternative to a large leg encircling lattice boom crane. Turbine components can be loaded onto the vessel V via shore based equipment and methods, or the vessel V can self-load all wind turbine components.

While not completely illustrated in the drawings, it is to be understood all the vessels disclosed herein preferably use a dynamic positioning (DP) system. Dynamic positioning (DP) is a computer-controlled system to automatically obtain and maintain a vessel's position and heading by using its own propellers and thrusters TH. Position reference sensors, combined with wind sensors, motion sensors and gyrocompasses, provide information to the dynamic positioning system computer pertaining to the vessel's position and the magnitude and direction of environmental forces affecting its position.

Other Positioning Systems

Figures 2A, 2B:
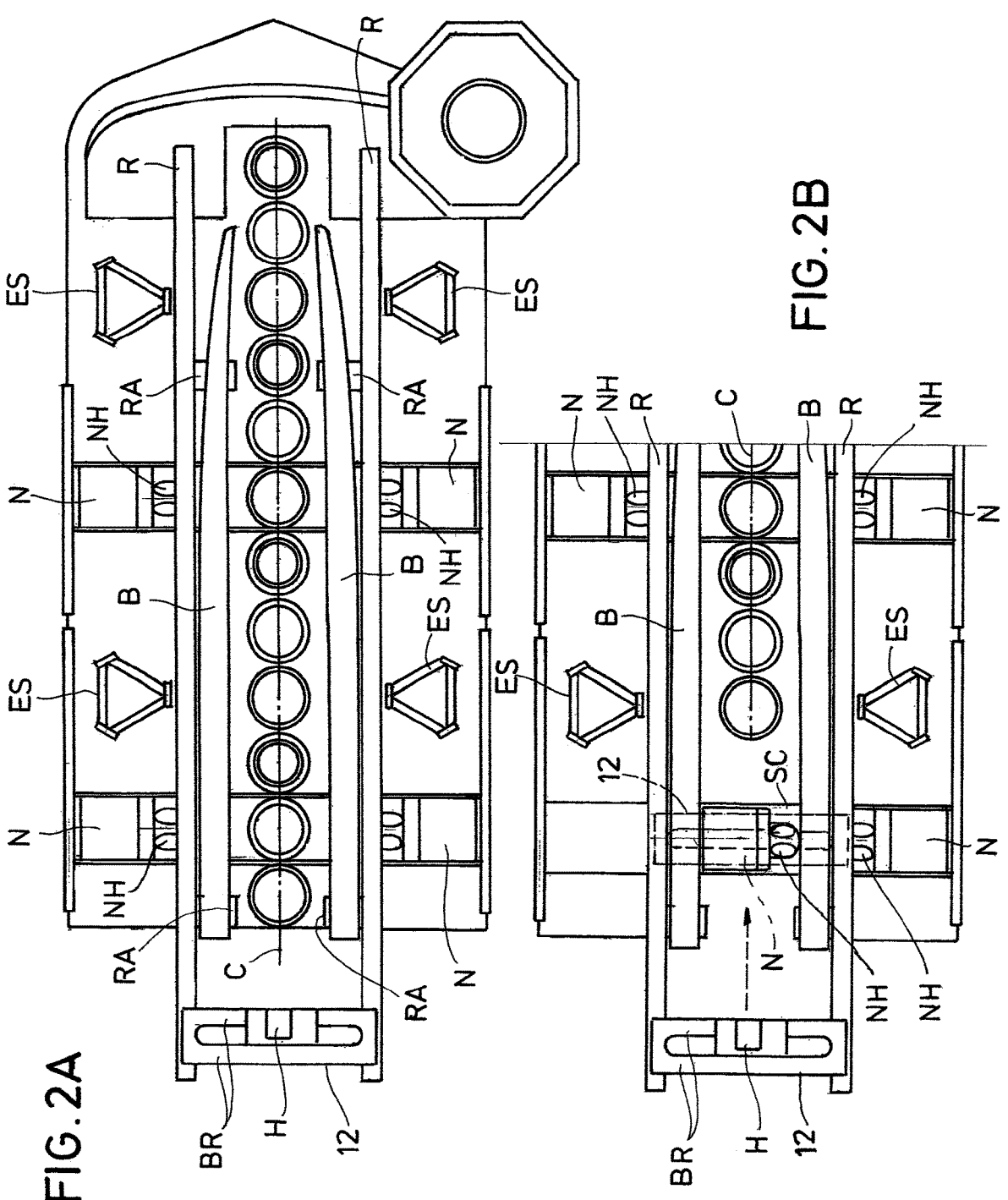
FIG. 2A is a plan view of the Turbine Installation Gantry System (T.I.G.S.) embodiment of FIG. 1 better illustrating the bridge crane hoist is a rolling load moveable on rails on the gantry structure along the vessel centerline configured with the wind turbine towers sections, the nacelle assemblies and blades for assembling 4 wind turbines.
FIG. 2B is a partial view similar to FIG. 2A to illustrate, after 3 tower sections are removed from the vessel for assembly, a nacelle assembly on a skid cart is skidded or moved from an outboard position from the vessel centerline to the vessel lifting position centerline for lifting by the bridge crane hoist, also, the bridge crane is shown in solid lines, similar to FIG. 2A, and moved to a position above the nacelle in dashed lines to lift the nacelle.

Longitudinal positioning—The gantry system 10 bridge crane 12 can move along the substructure guided by longitudinal rails R, as best shown in FIGS. 2A and 2B. The bridge crane can be propelled by conventional electric motors.

Transverse positioning—To move transversely across the gantry system 10 bridge, as best shown in FIGS. 2A and 2B, a hoist H is fitted onto transverse bridge rails BR and is also propelled by conventional electric motors.

Vertical positioning—In addition to the self-elevating jack up vessel, a large industrial hoist H provides vertical positioning.

Nacelle assembly skidding—The nacelle assemblies N can be moved by conventional means to the vessel centerline C using skidding carts SC.

Figure 3:
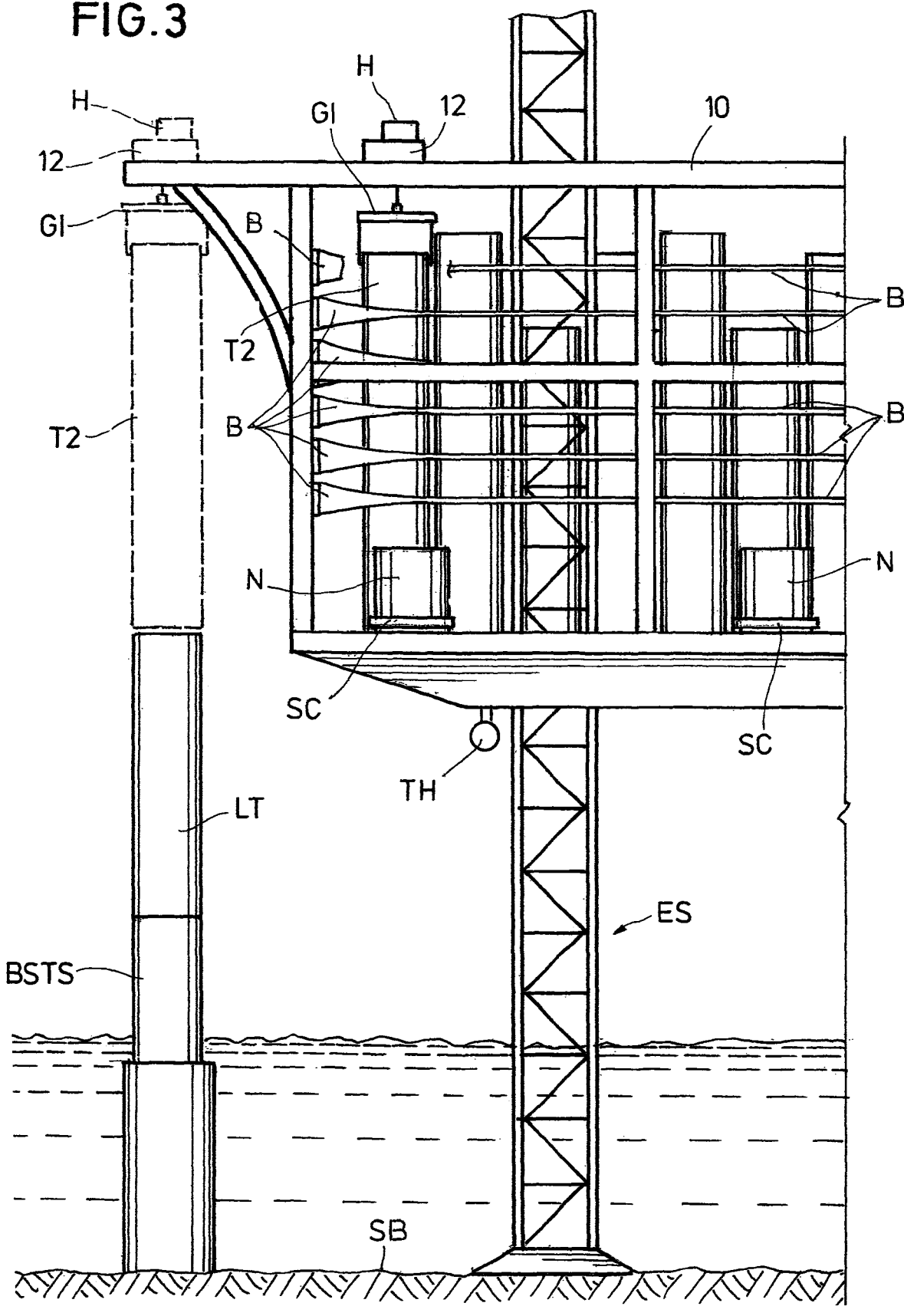
FIG. 3 is a partial side elevational view, similar to FIG. 1, but with the vessel deck further elevated from the seabed and the bridge crane hoist (shown in solid lines) lifting a second tower section for moving the second tower section to an assembly position (shown in dashed lines) aligned with the assembled first or lower tower section.

Method of Assembling:

Referring now to FIG. 1 and FIG. 3, the vessel V is positioned at a predetermined location adjacent to a seabed bottom supported tower section BSTS preferably using a dynamic positioning system to assemble a lower tower section LT. Using the vessel's self-elevating system, generally indicated as ES, as best shown in FIGS. 1 to 4, the bridge crane 12 is positioned at a desired elevation relative to the bottom supported tower section BSTS on the seabed SB.

Referring to FIGS. 1, 2A and 3, the lower tower section LT is assembled using a hoist H positioned on the bridge crane 12 to lift the lower tower section LT from along the vessel centerline C and move the lower tower section LT with the bridge crane 12 gripper G1 on the gantry substructure 10 to its assembled position. The lower tower section LT is lowered with the hoist H to fasten the lower tower section LT to the seabed bottom supported tower section BSTS using conventional fastening means.

The vessel's self-elevating system FS is used to elevate the vessel from a lower tower elevation, as illustrated in FIG. 1, to a higher elevation, as shown in FIG. 3, to position the bridge crane 12 at a desired elevation relative to the lower tower section LT. The bridge crane 12 is positioned above the second tower section T2 from along the vessel centerline C, as best shown in FIGS. 2A and 3 in solid lines. The hoist H then lifts the second tower section 12 to position the second tower section 12.

As best shown in dashed lines in FIG. 3, the bridge crane 12 is moved on the gantry substructure 10 to a cantilevered end with the second tower section 12 to an assemble position. The second tower section T2 is then lowered by the hoist H to assemble the second tower section T2 with the lower tower section LIT. The second tower section T2 is fastened to the lower tower section LT using conventional fastening means.

Turning now to FIG. 4A, again using the vessel's self-elevating system ES, the gantry substructure 10 and the bridge crane 12 are elevated to at a desired elevation relative to the second tower section T2. Simultaneously, the bridge crane 12 is positioned above a third tower section 13 along the vessel centerline C to assemble and fasten the third tower section T3 above and with the second tower section T2.

Returning to FIGS. 2A and 2B, a nacelle assembly N on a skidding cart SC is moved from its outboard stored position, as shown in solid lines, to its inboard position below and substantially between the rails R of the substructure 10, as shown in dashed lines. In other words, the skidding cart SC having the nacelle assembly N thereon is preferably skid or moved to the centerline C of the vessel V. The bridge crane 12 is then moved above the nacelle assembly N to lift the nacelle assembly N with the hoist H gripper G1.

Figures 4A, 4B:
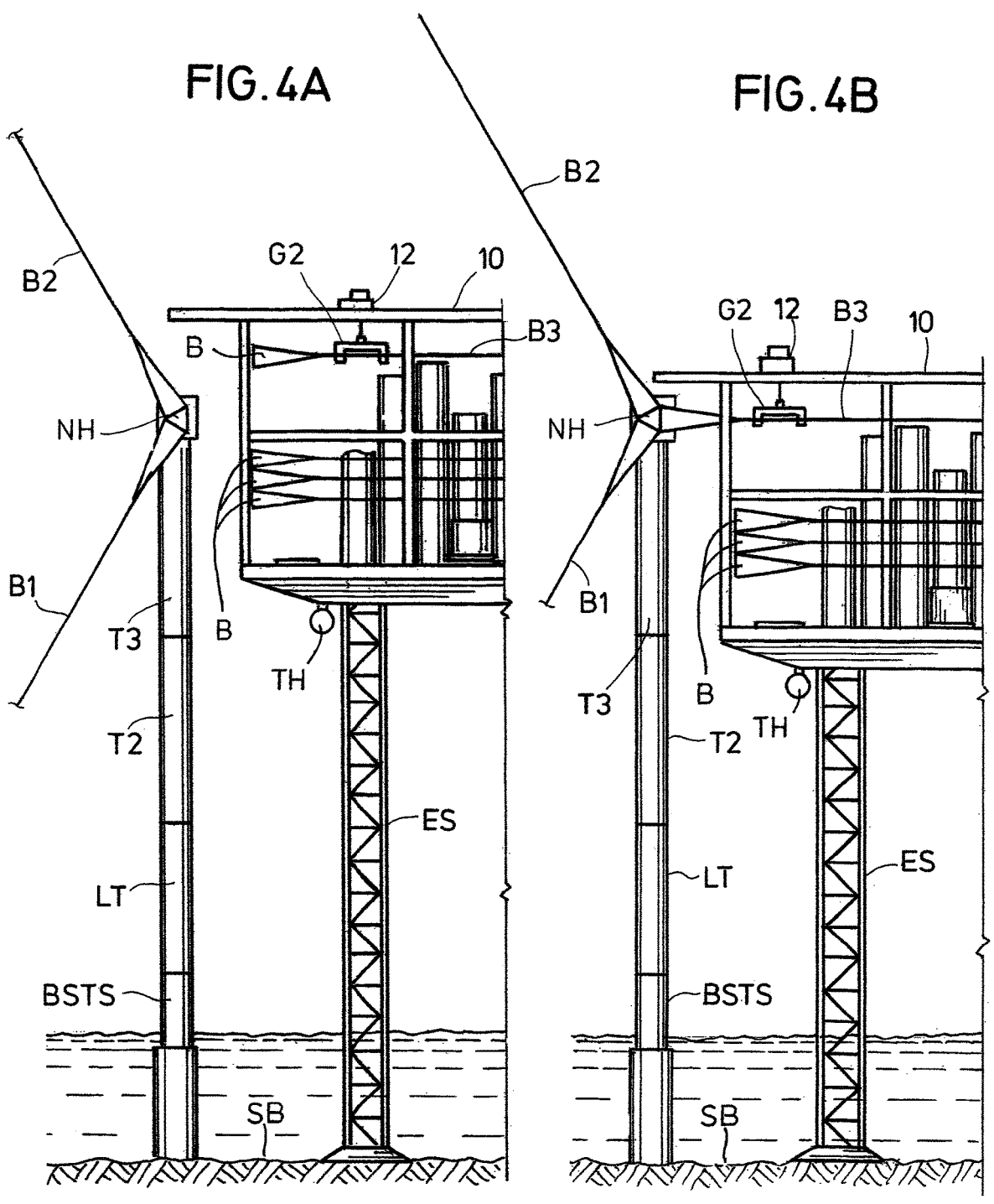
FIG. 4A is a partial side elevational view, similar to FIG. 3, but, after the third tower section and nacelle assembly are assembled, with the vessel deck further elevated from the FIG. 3 elevation from the seabed and the bridge crane hoist for lifting a third blade with a blade gripper, after assembling a first blade and a second blade with the nacelle hub.
FIG. 4B is a partial side elevational view, similar to FIG. 4A, but with the vessel deck lowered from the FIG. 4A elevation to align the third blade with the nacelle hub to assemble the third blade with the nacelle hub from the vessel.

The bridge crane 12, after the hoist H lifts the nacelle assembly N towards the top of the substructure 10, is moved to the cantilevered end of the substructure 10 to its installation position (similar to the position of the bridge crane 12 in FIG. 1 and in dash lines in FIG. 3). Depending on the orientation of the nacelle hub NH on the nacelle assembly N, the nacelle assembly N can be rotated so that the nacelle hub NH is oriented as desired, for example as shown in FIGS. 4A and 4B. The nacelle assembly N is then lowered on the third and/or upper tower section T3. The nacelle assembly N is preferably fastened with the tower section T3 using conventional fastening means so that the rotational axis of the nacelle hub NH is approximately 90° from the rails R of the substructure 10.

A holding member or gripper G1 for both the tower sections T and nacelle assembly N, as best shown in FIGS. 1 and 3, is then substituted out for a holding member or gripper G2, as best shown in FIGS. 4A and 4B, for the blades with and from the hoist H. The bridge crane 12 with the blade holding member or gripper G2 lifts, aligns and assembles a first blade B1 to the hub NH of the nacelle assembly N while the first blade B1 is between the rails R of the substructure 10, as best shown in FIGS. 2A, 2B, 4A and 4B.

As viewed in FIGS. 4A and 4B, the hub NH is then rotated 120° counterclockwise from the vessel V with the first blade B1 thereon. The bridge crane 12 with the blade holding member G2 then lifts, aligns and assembles a second blade B2 with the hub NH of nacelle assembly N while the second blade B2 is between the rails R of the substructure 10. The hub NH of the nacelle assembly N is then rotated another 120° counterclockwise with the first blade B1 and second blade B2 thereon, to the position shown in FIG. 4A. Of course, the blades could be fastened to the hub NH at other distances. For example, it is contemplated that 12 blades could be added 30° apart equidistant. As best shown in FIGS. 4A and 4B, the lift, align and assemble steps for a third blade B3 are repeated. Alternatively, the vessel V could be lowered after lifting a blade B from its rack to align the blade with the nacelle hub NH, as shown in the relative positions of the vessel in FIGS. 4A and 4B.

The legs of the jack up rig vessel are lifted by the elevating system ES so that the vessel is floating on the water surface to transit to the next predetermined location for installing the next wind turbine. Since the present T.I.G.S. embodiment is shown with components for assembling 4 wind turbines, 4 wind turbines can be assembled and installed from the vessel V without returning to shore.

It should be understood that the following are contemplated about and/or for use with the T.I.G.S. embodiment:

1. The T.I.G.S. embodiment concept applies to storage and transport of either a single wind turbine installation or multiple wind turbines.

2. The T.I.G.S. embodiment concept can be used with wind turbines having one or more blades.

3. The T.I.G.S. embodiment concept can be used for wind turbines with one or more tower sections.

The T.I.G.S. embodiment concept can be used for installing a complete wind turbine installation (WTI) or only a portion of a wind turbine installation (WTI), i.e. others may assemble a full length tower, leaving the T.I.G.S. embodiment concept for only assembling and installing the nacelle assembly and blades B.

4. For the T.I.G.S. embodiment concept, a nacelle assembly N may be moved from storage to an assembly position, such as the vessel centerline C, by means other than a skidding cart SC.

5. The T.I.G.S. embodiment concept may be oriented transversely as compared to along a vessel V longitudinal centerline C, i.e. rotate entire concept by go degrees. This would allow for wind turbine installations over the side of the vessel V, as compared to off or overboard of the vessel stern or transom TS, as depicted in the FIGS. 1 to 4B.

6. The T.I.G.S., embodiment concept storage location and orientation may vary for the wind turbine components.

7. The T.I.G.S. embodiment bridge crane 12 may be modified for additional handling capabilities, i.e. a handling system, such as in the T.A.P.S. embodiment, which allows a tower to pass thru the bridge crane, thus elevating portion of tower above the bridge crane elevation. An additional handling system may be added at a lower level of the vessel, where tower(s) are stored horizontally on the vessel where bridge crane(s) are used to move, a full length tower and transfer such full length tower from a horizontal to a vertical position from the vessel.

8. The T.I.G.S. embodiment concept can also be used to transport and install a fully assembled Wind Turbine Installation (WTI) assembly. Such method may incorporate an upper and lower handling system, such as in the T.A.P.S. embodiment, which attaches to an upper and lower part of fully assembled tower. Such handling system allows a portion of the Wind Turbine Installation (WTI) assembly at a higher elevation than the bridge crane. This concept applies to both self-elevating as well as floating vessels.

9. An alternative of item above 8 is transport, handling, and installation of a fully assembled the Wind Turbine Installation from a horizontal position to a vertical position.

10. The T.I.G.S. embodiment may be land-based (onshore-based) and used to assemble and load an assembled Wind Turbine Installation onto a vessel and/or load Wind Turbine Installation components onto a vessel.

11. The T.I.G.S. embodiment concept contemplates that the blades may be assembled with the nacelle assembly N on the vessel V thereby eliminating relative motion between vessel V and nacelle N during the blade installation. The nacelle assembly N and its hub NH orientation may vary for such method.

12. The T.I.G.S. embodiment concept contemplates that the blades store outboard could be handled by other means (i.e. knuckle boom crane, etc.).

Skidding Turbine Installation Crane (S.T.I.C. Embodiment Detailed Description

Figure 5:
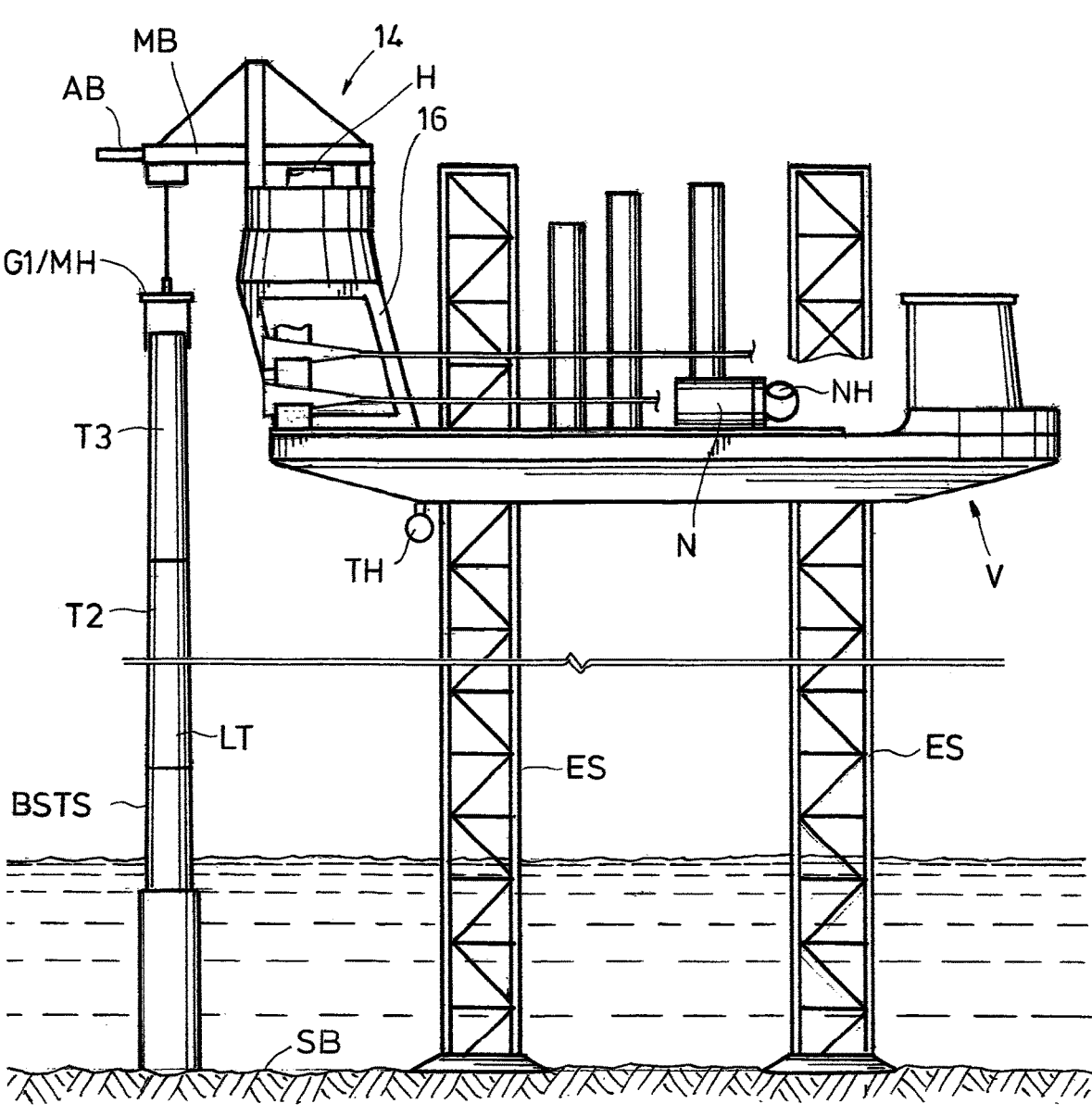
FIG. 5 is a side elevational view of the Skidding Turbine Installation Crane (S.T.I.C.) embodiment of the present invention illustrating the vessel deck elevated from the seabed and further illustrates a rotatable crane having a main boom and an auxiliary boom on a skidding structure, the tower and nacelle griper from hoist the main boom is shown aligning a third tower section with a second and lower tower sections, the rack for holding the blades is illustrated broken away for clarity.
Figure 6:
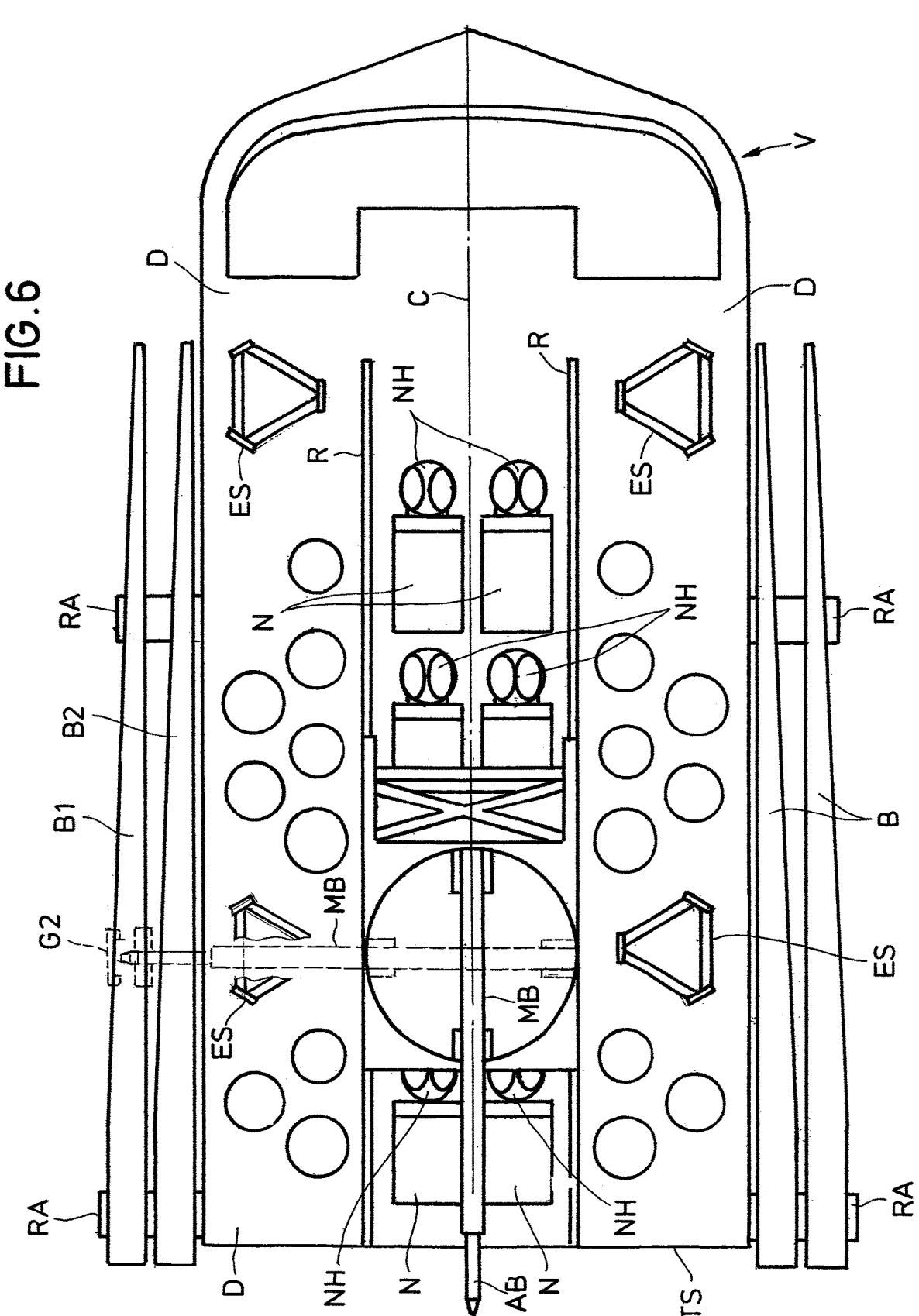
FIG. 6 is a plan view of FIG. 5 illustrating the stored position of the wind turbine tower sections, and the nacelle assemblies onboard the vessel deck along with wind turbine blades on racks outboard of the vessel, FIG. 6 further illustrates the rotatable boom crane on the skidding structure that moves along the parallel rails, one rail on each side of the vessel centerline, furthermore the main and auxiliary booms, as positioned in FIG. 5, is shown in solid line and the main and auxiliary boom are also is shown in dashed lines to illustrate the extendable auxiliary boom blade gripper lifting one of the blades from an outboard rack.

The Skidding Turbine Installation Crane (S.T.I.C.) embodiment, shown in FIGS. 5 to 8, provides a safer, more capable system for installing bottom supported offshore wind turbines. Turning to FIGS. 5 and 6, the boom crane, generally indicated at 14, is mounted onto a skidding structure or pedestal 16. One embodiment has a traveling hoisting system, similar to a gantry system 10 of FIGS. 1 to 4B, which supplies lifting power to both the tower gripper G1 or main hook MH (FIGS. 5 and 7), and the blade gripper G2 or auxiliary hook AH (FIGS. 6 and 8), suspended from their respective main boom MB and auxiliary boom AB cranes. As best shown in FIG. 6, the crane 14 both rotates and skids longitudinally to access and lift the wind turbine components. The main boom MB gripper G1 is preferably used to lift the tower's sections T and the nacelle assemblies N therewith, while the auxiliary hook AH or blade gripper G2 is preferably used to assemble the blades B. The turbine tower sections T are releasably stored on the port, the starboard, or both sides of the Wind Turbine Installation "WTI" vessel, such as a self-elevating or jack-up rig, as shown in FIGS. 5 to 8. As described above, while not illustrated, the vessel V preferably uses a dynamic positioning (DP) system for positioning the vessel V relative to the bottom supported tower section BSTS. Nacelle assemblies N are releasably stored along the vessel V centerline C between the skid rails R. Blades B are releasably stored longitudinally in cradles or racks RA off or outboard the port, the starboard, or both sides of the vessel V. While not illustrated for clarity of system for a 20 megawatt turbine, 18 blades would be stored on the vessel V, 9 blades on each side of the vessel. These 18 blades, 18 tower sections and 6 nacelle assembly can be assembled into 6 wind turbines. Of course, if different size megawatt turbines are to be installed, e.g., 5 megawatt, then different number of blades, nacelle assembles and tower sections could be used. The longitudinal translation of the rotatable crane 14 along the vessel centerline allows full deck D access. The vessel V is designed to self-load all turbine components from onshore.

Other Positioning Systems

Longitudinal positioning—The boom crane 14 can move along the longitudinal parallel skid rails R, propelled by a conventional skidding system.

Transverse positioning—The rotation of the crane 14 allows transverse positioning. The crane 14 is preferably mounted to the skidding structure or pedestal 16 through a slew bearing system.

Vertical Positioning—A large conventional industrial hoist H is preferably adapted for use with the main boom MB and the auxiliary boom AB.

Auxiliary Boom—Extendable to access blades B releasably stored outboard of the vessel V side shell on racks RA.

Block Trolley—Allows main hook MH or gripper G1 to travel along the main boom MB path.

Method of Assembling

As best shown in FIG. 5, the vessel V arrives at a predetermined location having a seabed bottom supported tower section BSTS and is preferably positioned using a dynamic positioning (DP) system. The vessel V is positioned for assembling the lower tower section LT from the transom TS of the vessel V. Similar to FIG. 1, the vessel's elevating system ES is used to position the S.T.I.C. embodiment system at a desired elevation relative to the bottom supported tower section BSTS supported on the seabed SB.

Once vessel V is positioned on the seabed SB, the S.T.I.C. embodiment skidding structure or pedestal 16 system skids from a central position on the vessel V and the boom crane 14 rotates to lift the lower tower section LT. The lower tower section LT is lifted with the main boom gripper G1 from the deck and, after the skidding structure 16 moves to the cantilevered position, as shown in FIG. 5, the main boom MB again rotates to align the first or lower tower section LT with the seabed bottom supported tower section BSTS. Additional skidding may be required to align the first or lower tower section LT with the section BSTS.

The first/lower tower section LT is lowered to the bottom supported tower section BSTS using the main boom hoist H, as best shown in FIG. 5. The lower tower section LT is then fastened to the bottom supported tower section BSTS using conventional fastening means.

Figure 7:
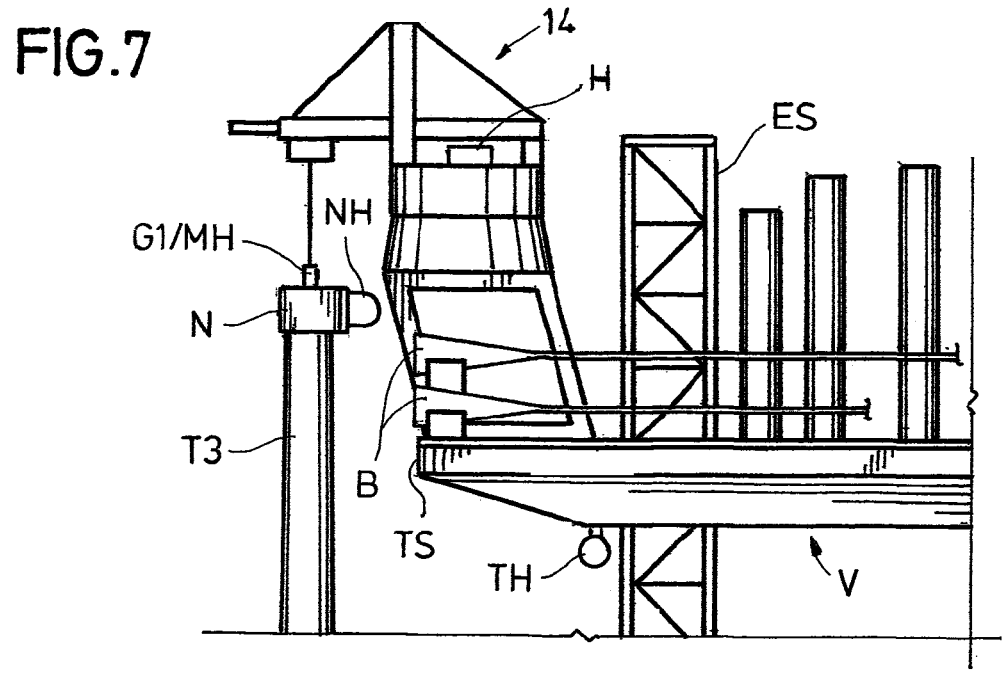
FIG. 7 is a partial side elevational view, similar to FIG. 5, illustrating the main boom having a gripper for aligning a nacelle assembly with an upper tower section.

Similar to FIG. 3, the vessel's elevating system ES is then used to achieve the desired elevation relative to the lower tower section LT. Simultaneously, the crane 14 rotates, skids and lifts a second tower section T2. The main boom is rotated again and the crane 14 skids along rails R to align the second tower section T2 with the first/lower tower section LT. The second tower section T2 is then fastened to the first tower section LT using conventional fastening means. Additional tower sections, such as the third tower section T3, as best shown in FIGS. 5, 6 and 7, are aligned and fastened using the crane 14.

The S.T.I.C. embodiment then skids to pick up one of the 6 nacelle assemblies N with gripper G1. As best shown in FIG. 7, the crane 14 positions the nacelle assembly N aft of vessel transom TS and lowers the nacelle assembly N onto the top of the last fastened tower section, such as best illustrated in FIG. 7, the tower section T3. The nacelle assembly N is lowered using with the main boom MB hoist H and is fastened using conventional fastening means to the last fastened tower section T3.

Figure 8:
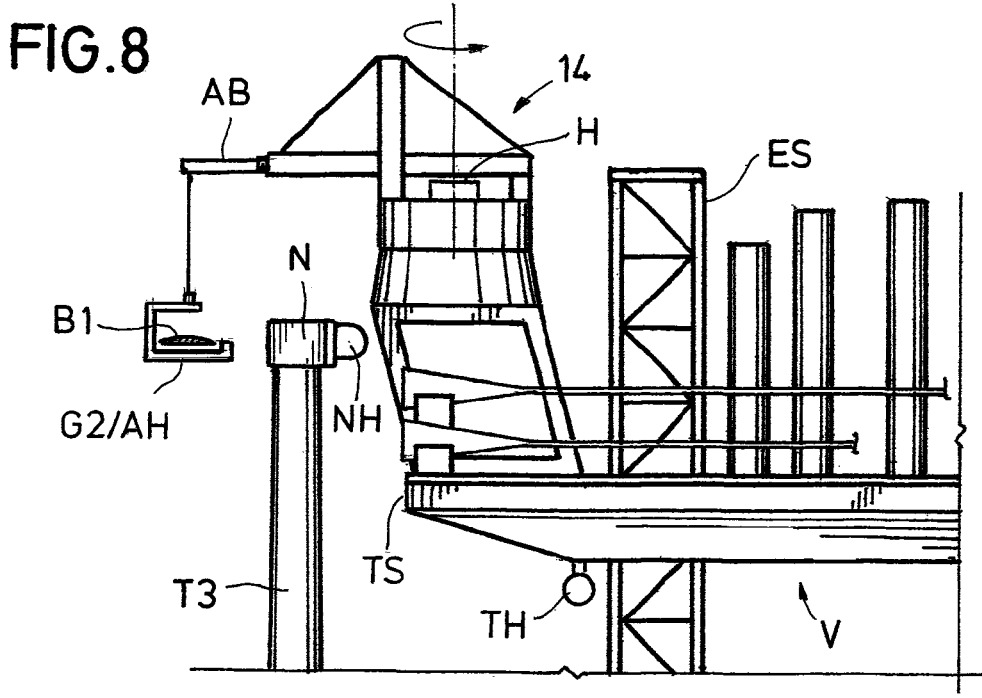
FIG. 8 is a partial side elevational view, similar to the FIG. 7, illustrating the extendable auxiliary boom with a blade gripper, similar to the blade gripper of FIG. 6, suspended from a hoist for aligning a blade with a nacelle hub.

As best shown in FIG. 6, using the extendable auxiliary boom AB in its extended position, as shown in dash lines, a first blade B1 is grabbed at its mass center with the blade auxiliary hook AH or blade gripper G2. While the blade gripper G2 is illustrated in FIG. 8 with its opening facing the vessel V, its opening could be used facing away from the vessel. The auxiliary boom AB with the first blade B1, as best shown in solid line in FIGS. 6 and 8, now above the elevating system ES legs, is rotated to align the first blade B1 with the hub NH of the nacelle assembly N.

As best shown in FIG. 8, the first blade B1 is assembled with the rotatable hub NH. Similar to FIGS. 4A and 4B, the hub NH and blade B1 are rotated 120°. The S.T.I.C. skidding structure 16 and rotatable crane 14 then grips a second blade B2 and assembles the second blade B2. The process is repeated as needed for assembling all blades, preferably 3 blades.

The S.T.I.C. skidding structure or pedestal 16 is then skidded to its central stored position, the vessel V lowered with the elevating system ES so that the floating vessel is transited to the next predetermined location. The above method can be performed until all 6 wind turbines are assembled and installed from the vessel V without returning to shore.

It should be understood that the following are contemplated about and/or for use with the S.T.I.C. embodiment:

1. The S.T.I.C. embodiment concept applies to storage and transport of either a single wind turbine installation, or multiple wind turbines.

2. The S.T.I.C. embodiment concept can be used for wind turbines of one or more blades.

3. The S.T.I.C. embodiment concept can be used for wind turbines of one or more tower sections.

4. As with the T.I.G.S. embodiment, the S.T.I.C. embodiment concepts can be used for installing a complete wind turbine installation (WTI) or only a portion of a wind turbine installation (WTI), i.e. others may assemble a full length tower T, leaving the S.T.I.C. embodiment concept for only assembling the nacelle assembly N and blades B.

5. The S.T.I.C. embodiment concept may be oriented transversely as compared to along a vessel V longitudinal centerline C, i.e. rotate entire concept by go degrees. This would allow for wind turbine installations over the side of the vessel V, as compared to off or overboard of the vessel stern or transom TS, as depicted in above FIGS. 1 to 8.

6. The storage location and orientation of towers T, nacelles N, and blades B for the S.T.I.C. embodiment may vary from those shown in FIG. 6.

7. The S.T.I.C. embodiment concept may use an alternate type/style crane. The S.T.I.C. embodiment concept crane emphasizes full access to the vessel deck and even to the outboard blade racks RA via the S.T.I.C. longitudinal skidding structure 16 capability, the crane 14 rotation and the extendable auxiliary boom AB. The S.T.I.C. concept is not limited to the specific crane described above. For example, it is contemplated that a properly sized lattice boom crane could be positioned on the pedestal 16.

8. The S.T.I.C. embodiment concept can be used to transport and install a fully assembled wind turbine installation (WTI).

9. Blades B may be assembled with the hub NH of the nacelle assembly N while on vessel V—this would advantageously eliminate relative motion during blade assembly. For example, the blade assembly on a nacelle assembly N hub NI can be made on a tower section aft of the legs of the elevating system ES, with blade orientation transversely. Nacelle assembly N and its hub NH orientation may vary for such method.

10. The S.T.I.C. embodiment concept may be land-based (shore-based) and used to assemble and load an assembled Wind Turbine Installation onto a vessel and/or load Wind Turbine Installation components onto a vessel.

Turbine Assembly and Positioning System (T.A.P.S.) Embodiment

Detailed Description

The Turbine Assembly and Positioning System (T.A.P.S.) embodiment, shown in FIGS. 9 to 12, delivers a safe, precise method of installing bottom supported offshore wind turbines. A cantilever structure or system, generally indicated at 18, propelled by a skidding system, is mounted to a vessel deck D. The cantilevered structure or system 18 comprises a handling system HS which provides for transverse, vertical and rotational movement and positioning of the wind turbine components, as disclosed in detail below. In this T.A.P.S.

embodiment, the nacelles assemblies N are preferably assembled on top of a tower section T while at port or installed offshore on the vessel deck during the assembly procedure as discussed in detail herein. The assembled nacelle and tower assemblies are each releasably sea fastened to independent skidding carts SC on the deck D. The tower sections LT and T2 are also illustrated assembled and can be assembled onshore and/or offshore on the vessel deck. All blades B are releasably stored on either the starboard, the port, or any side of the vessel V, outboard of the vessel including the vessel elevating system ES jack up legs. Blades B can be assembled onboard and fastened, such as with bolts, to the hub NH of the nacelle assembly N using a knuckle boom crane, generally indicated at 20. While the FIGS. 9 to 12, at most illustrate 6 blades B, racks RA, for example, for a 20 megawatt turbine could be provided with 9 blades—3 blades for each of the 3 nacelle assemblies N. This T.A.P.S. embodiment system eliminates the effects of relative motion between the vessel V and components including the wind turbine nacelle assembly N while installing the blades B. Such relative motion between the vessel and wind turbine components while being assembled on industry standard installations are problematic. By eliminating this relative motion, this T.A.P.S. embodiment, along with the other embodiments disclosed herein, can provide precise control when assembling the wind turbine components including the blades B. The turbine components can be assembled and installed off or outboard of the vessel V side or off or outboard the stern or transom TS. The vessel V can advantageously self-load all wind turbine components onshore and offshore.

Other Positioning Systems

Figure 9:
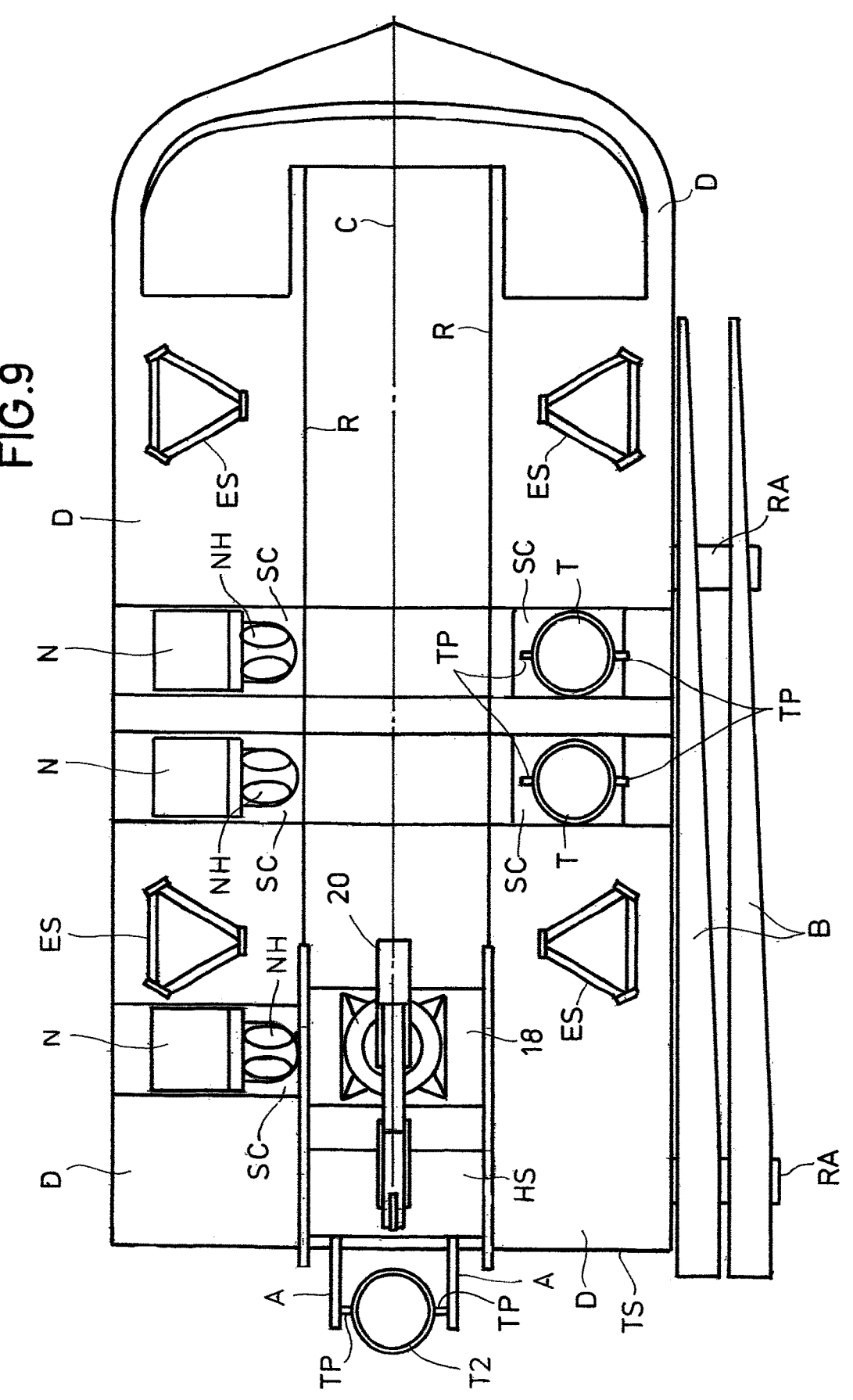
FIG. 9 is a plan view of the Turbine Assembly and Positioning System (T.A.P.S.) embodiment illustrating the stored position of the wind turbine tower sections, and nacelle assemblies relative to the vessel centerline and the blades on outboard racks, further the engagement of the handling system slots with the tower section corresponding radially outwardly extending pins is better illustrated.

Longitudinal positioning—As best shown in FIG. 9, the knuckle boom crane 20 is affixed to the cantilevered structure 18 to move along longitudinal skid rails R on opposite side of the vessel centerline C (similar to the rails R shown in FIGS. 2A, 2B and 6). The cantilevered structure is propelled by a conventional skidding system.

Alternate System—The layout as shown in FIG. 9 can be modified to operate off or outboard of the port and/or starboard sides of the vessel V instead of off or outboard of the transom TS.

Transverse positioning—A hydraulic or electric system is employed to move the Wind Turbine Installation (WTI) components transversely.

Vertical positioning—The Wind Turbine Installation (WTI) is also moved vertically by a hydraulic or electric system.

Nacelle assembly N skidding—The assembled nacelle assembly N and tower section and/or assembled tower sections are moved from either or both the starboard or port of the vessel V to the vessel centerline C, to and along the path of the cantilevered structure 18 handling system HS, using independent skidding carts Sc.

Component Rotation—The wind turbine installation (WTI) components can be rotated along their vertical axis using hydraulics and guided by a pin-slot system, as discussed below in detail.

Method of Assembly

Figure 10:
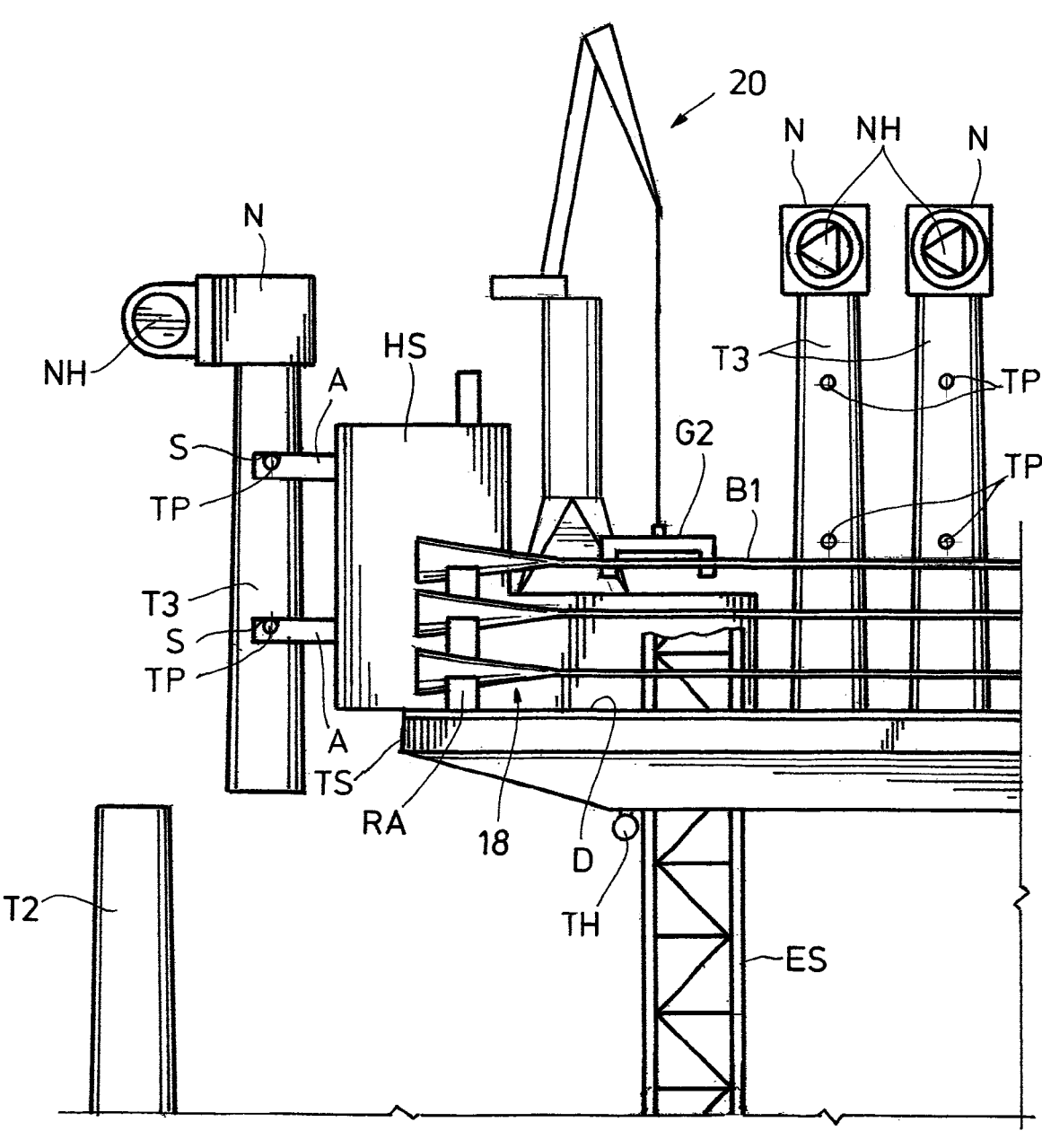
FIG. 10 is a partial elevational view of the T.A.P.S. embodiment of FIG. 9 where the nacelle assembly is assembled with a tower section on the vessel deck or before being loaded on the vessel and aligned with a tower section using the handling system, illustrated in FIGS. 9,11 and 12, further the crane is shown on a cantilever structure for lifting the wind turbine blades with a blade gripper.
Figure 11:
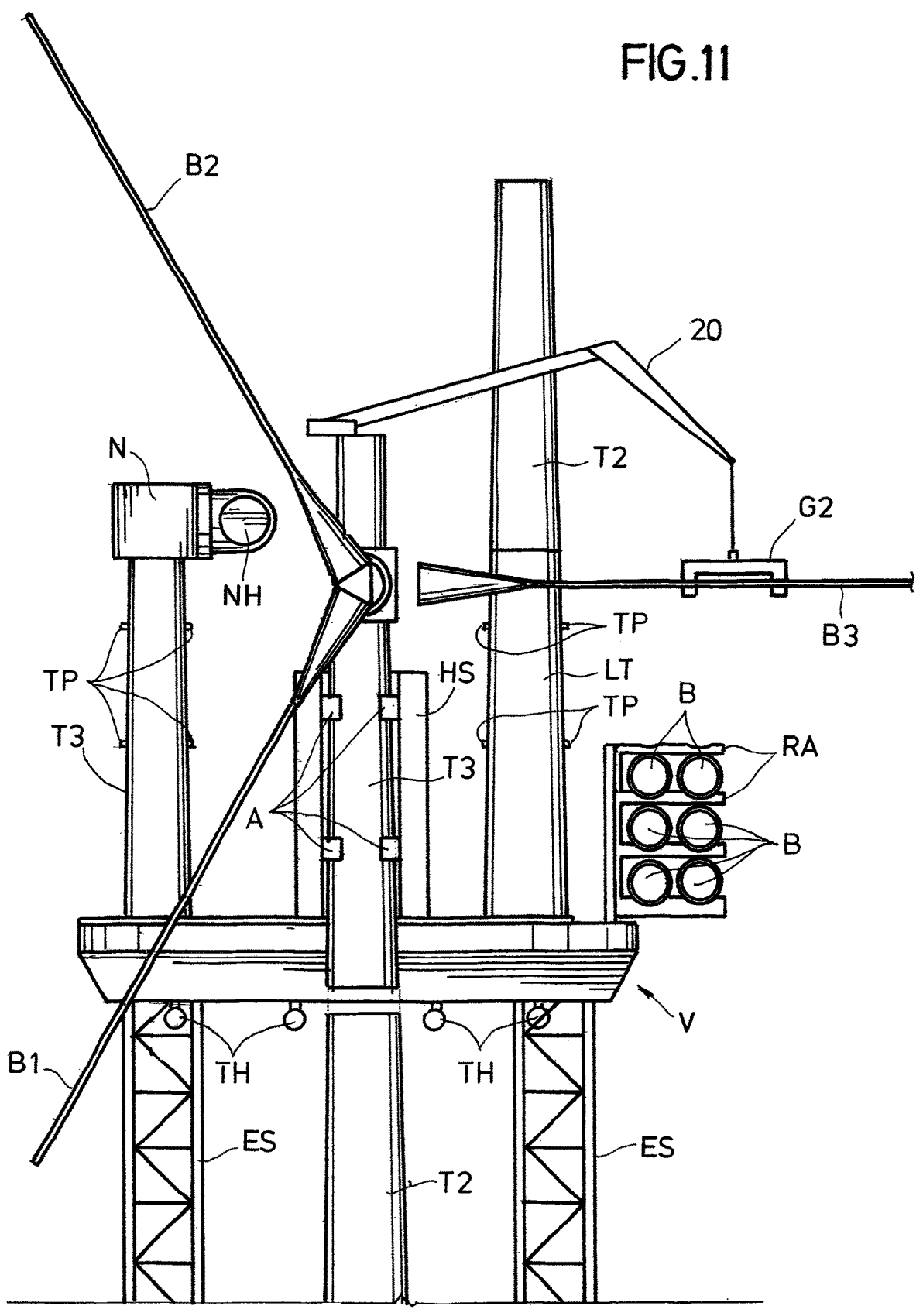
FIG. 11 is a rear, transom or stern elevational view of the vessel of the T.A.P.S. embodiment illustrating the crane aligning a third blade with the nacelle hub while the handling system suspends the assembled nacelle assembly and tower section outboard of the vessel deck, FIG. 11 further illustrates both an additional stored assembled nacelle assembly and tower section, assembled tower sections and better illustrates some of the blades outboard of the vessel deck in some of the racks.
Figure 12:
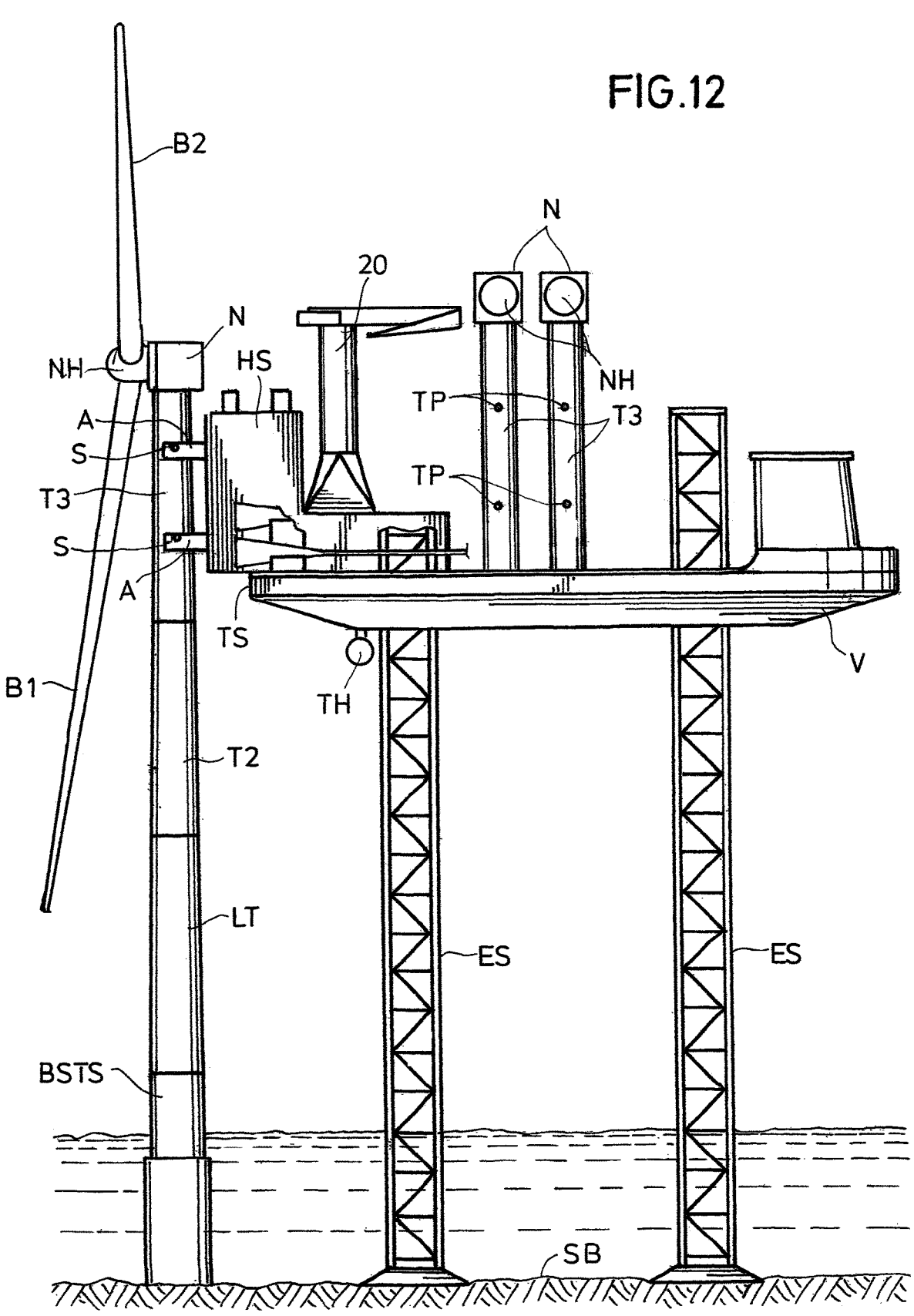
FIG. 12 is a side elevational view of the T.A.P.S. embodiment of the present invention with its handling system cantilevered outboard of the vessel deck or transom and suspended by the cantilever structure for aligning an assembled nacelle assembly and tower section while a crane on the cantilever structure is illustrated in its stored position.

As best shown in FIG. 12, the vessel arrives at predetermined location and the dynamic positioning (DP) system positions and maintains the vessel V for installing the assembled lower or first tower section LT and tower section T2 to the bottom supported tower section BSTS. See also FIG. 11. The vessel's elevating system ES is used to position the cantilever structure 18 at a desired elevation. Then, as best shown in FIG. 9, the handling system HS is moved towards and to the bow of the vessel on the skidding system rails R. One of the assembled tower section LT and tower section T2 are skidded to the vessel centerline C so the handling system HS can use the slots S in its arms A with the corresponding tower pins TP, as best shown in FIGS. 9, 10, 11 and 12, to move the assembled lower tower section LT and tower section T2 to the illustrated outboard installation position of FIG. 9. Note the tower pins TP on the tower sections, as best shown in FIGS. 9, 10, 11 and 12, are received by upwardly facing slots S in the fork or arm A of the handling system HS for vertical, transverse and rotational positioning of the components as discussed herein. The assembled first/lower tower section LT tower section T2 are lowered with the handling system HS vertical positioning system after being aligned with the seabed bottom supported tower section BSTS. If needed, the assembled lower tower section LT and tower section T2 can be rotated with the handling system HS rotation system.

After the assembled lower tower section LT and tower section T2 are aligned, the assembled lower tower section LT and tower section T2 are fastened with the seabed bottom supported tower section BSTS using conventional fastening means.

After the assembled lower tower section LT and tower section T2 are released from the handling system HS, the vessel's elevating system ES raises the cantilever structure 18 to a desired elevation relative to the tower section T2. The handling system HS is moved towards the vessel bow depending on which nacelle assembly is to be assembled. The third tower section T3 having an assembled nacelle assembly N is moved on a skidding cart SC from the vessel V port or starboard to the travel path of the cantilever structure 18, such as along the vessel V centerline C. FIGS. 9, 10 and 12 illustrates 3 assembled nacelle assemblies N and tower section T3 on independent skidding carts SC on the port side of the vessel.

The handling system HS arm slots S receive the corresponding tower pins TP of the assembled upper tower section T3 and a nacelle assembly N and lifts the assembled upper tower section T3 and nacelle assembly N with the handling system HS vertical positioning system. After returning the tower section T3 and nacelle assembly N skidding cart SC to its original outboard location, out of the travel path of the cantilever structure 18, the cantilever structure 18 moves the assembled tower section T3 and nacelle assembly N to the cantilevered position, as best shown in FIGS. 10, 11 and 12

As best shown in FIG. 10, using the knuckle boom crane 20 positioned on the cantilever structure 18 skidding system, as shown in FIGS. 9 to 12, a first blade B1 is gripped using the blade gripper G2. The first blade B1 is aligned and fastened with the nacelle assembly N hub NH. Note all blades B are aligned and fastened while the assembled nacelle N assembly and upper tower section T3 are suspended from or cantilevered from the vessel V. This eliminates relative motion between the assembled nacelle assembly N hub NH and blades B during the blade B assembly and fastening. The nacelle assembly N hub NH is then rotated 120° with the first blade B1 thereon. Using the crane blade gripper G2, a second blade B2 is gripped and aligned and fastened with the nacelle assembly N hub NH. As best illustrated in FIG. 11, the third blade B3 is aligned and fastened with the hub NH so the 3 blades are equidistant.

Continuing to use the handling system HS on the cantilever structure 18, the cantilevered assembled tower section T3 and nacelle assembly N with the 3 blades B1, B2, B3 fastened to its hub NH are aligned and then fastened with the tower section T2, as best shown in FIGS. 10,11 and 12, using conventional fastening means. Thereafter, the handling system HS slot/pin interengagement is disengaged from the tower section T3 pins TP.

After the cantilever structure 18 is moved to its central stowed position, the elevating system ES lowers the vessel V to its floating position so that the vessel can transit to next predetermined location for installing the next wind turbine. Note that while the knuckle boom crane 20 is shown affixed to the cantilevered structure 18 in FIGS. 9 to 12, alternatively, it is contemplated that the crane 20 could be affixed to the vessel V deck D or that an additional crane could be affixed to the deck.

The above T.A.P.S. embodiment system and method could be used until all the remaining 2 wind turbines on the vessel V are assembled and installed at their predetermined locations without the vessel returning to shore. The cantilever structure 18 is preferably moved to its central stored position on the vessel V to prepare for its next installation.

It should be understood that the following are contemplated about or for use with the T.A.P.S. embodiments:

1. The T.A.P.S. embodiment concept applies to storage and transport of either a single wind turbine installation, or multiple wind turbines.

2. The T.A.P.S. embodiment concept can be used for wind turbines of one or more blades.

3. The T.A.P.S. embodiment concept can be used for wind turbines of one or more tower sections.

4. The T.A.P.S. embodiment concept can be used for installing a complete wind turbine installation (WTI) or only a portion of a wind turbine installation (WTI), i.e. others may install a tower, leaving the T.A.P.S. embodiment concept to install the assembled nacelle assembly N and top tower section T3 with blades only.

5. For the T.A.P.S. embodiment concept, the assembled nacelle assemblies N and the tower section T3 and/or the assembled lower section LT and tower section T2 may be moved from storage to assembly position along the vessel centerline C by means other than a skidding cart SC.

6. The vessel arrangement may be modified as to allow the T.A.P.S. embodiment to install wind turbine installation (WTI) off or outboard of the vessel bow as well as the vessel stern. This can be accomplished via T.A.P.S. embodiment longitudinal movement along entire length of the vessel V, as best shown in FIGS. 9 to 12, or this may be accomplished by using two separate T.A.P.S. systems—one located on the bow of the vessel V and one located on the stern or transom TS of vessel V.

7. The T.A.P.S. embodiment concept may be oriented transversely as compared to the vessel longitudinal centerline C (see FIG. 9) by rotating the entire concept by 90 degrees. This would allow for wind turbine installations (WTI) over the 2 sides of vessel V, as compared to off the vessel stern or transom TS, as depicted in FIGS. 9 to 12.

8. The storage location and orientation may vary for the wind turbine components from that shown in FIGS. 9 to 12.

9. The T.A.P.S. embodiment may use an alternate handling system, i.e. a griper type system as opposed to fork lift with slot/pin.

10. The T.A.P.S. embodiment concept can be used to transport and assemble fully assembled wind turbine assemblies, e.g. a nacelle assembly with blades fastened thereto all fastened to a full length tower.

11. The T.A.P.S. embodiment may transport and assemble wind turbine assembles with a side fork lift type handling system which retracts and extends in the transverse direction.

12. The T.A.P.S. embodiment may be land-based (shore-based) and used to assemble and load a full assembled wind turbine installation onto the vessel and/or load wind turbine installation components onto vessel.

13. The T.A.P.S. embodiment may be used to fully assemble WT (tower, nacelle, and blades) on vessel V prior to installing onto BSTS. In other words, WTI is fully assembled on vessel V then positioned and installed onto BSTS. This eliminates relative motion during entire assembly process.

Combination Embodiment from Selected Systems and Methods of the T.I.G.S., S.T.I.C. and T.A.P.S. Embodiments It is contemplated that selected systems and methods of the Turbine Gantry Installation System (T.I.G.S.), Skidding Turbine Installation Crane (S.T.I.C.), and Turbine Assembly and Positioning System (T.A.P.S.) embodiments may be combined and modified.

Figure 13:
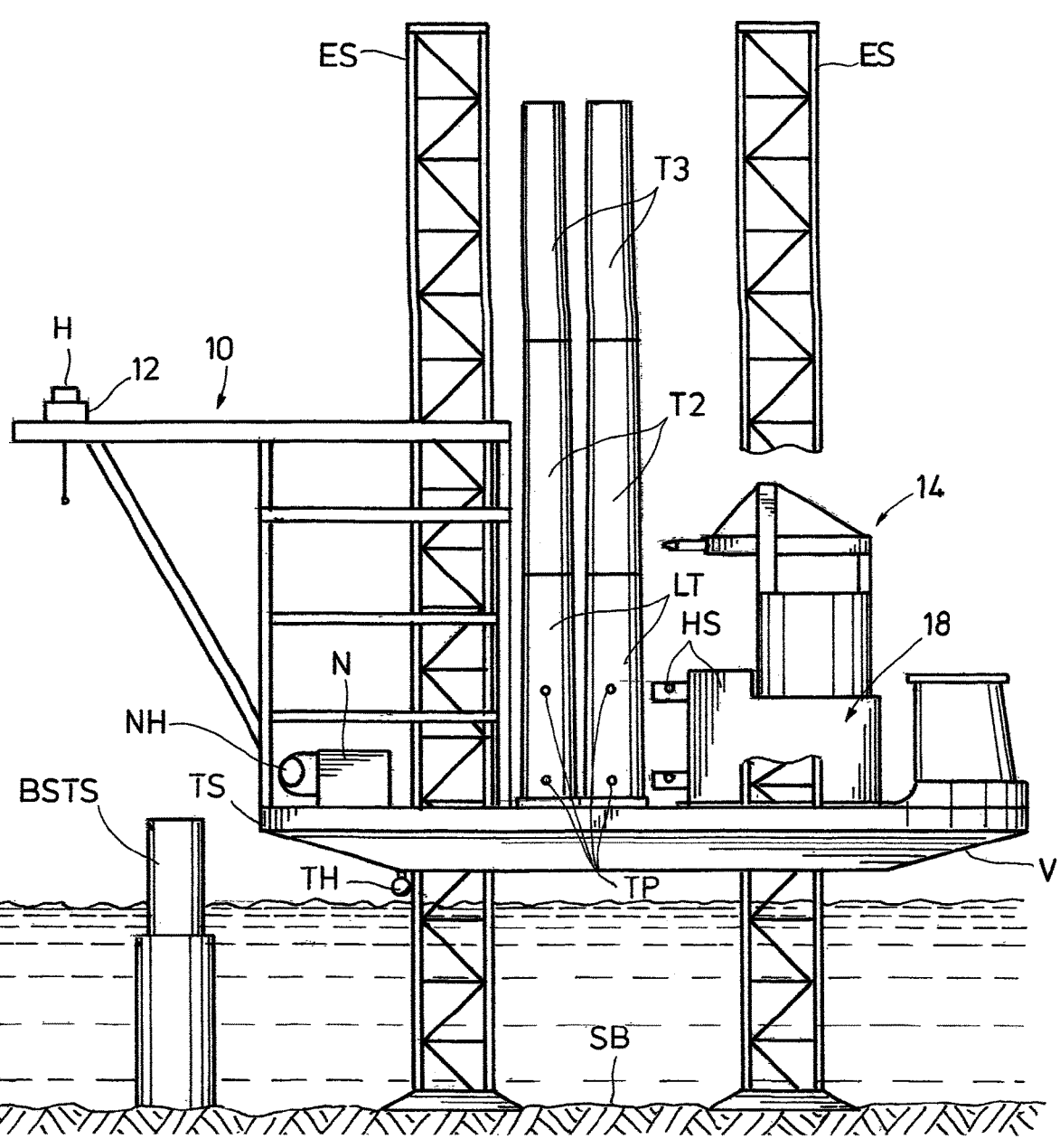
FIG. 13 is a side elevational view of a combination embodiment of the above T.I.G.S., S.T.I.C. and T.A.P.S. embodiments illustrating a gantry structure on the vessel deck, similar to FIGS. 1 to 4B, a rotatable crane with a main boom and an auxiliary boom on a skidding structure (a jack up leg is shown in broken view for better clarity), similar to FIGS. 5 to 8, and a handling system in combination with a cantilever structure (a jack up leg is again shown in broken view for better clarity), similar to FIGS. 9 to 12, further illustrated are assembled 3 tower sections for further assembling with the illustrated seabed bottom supported tower section.
Figure 14:
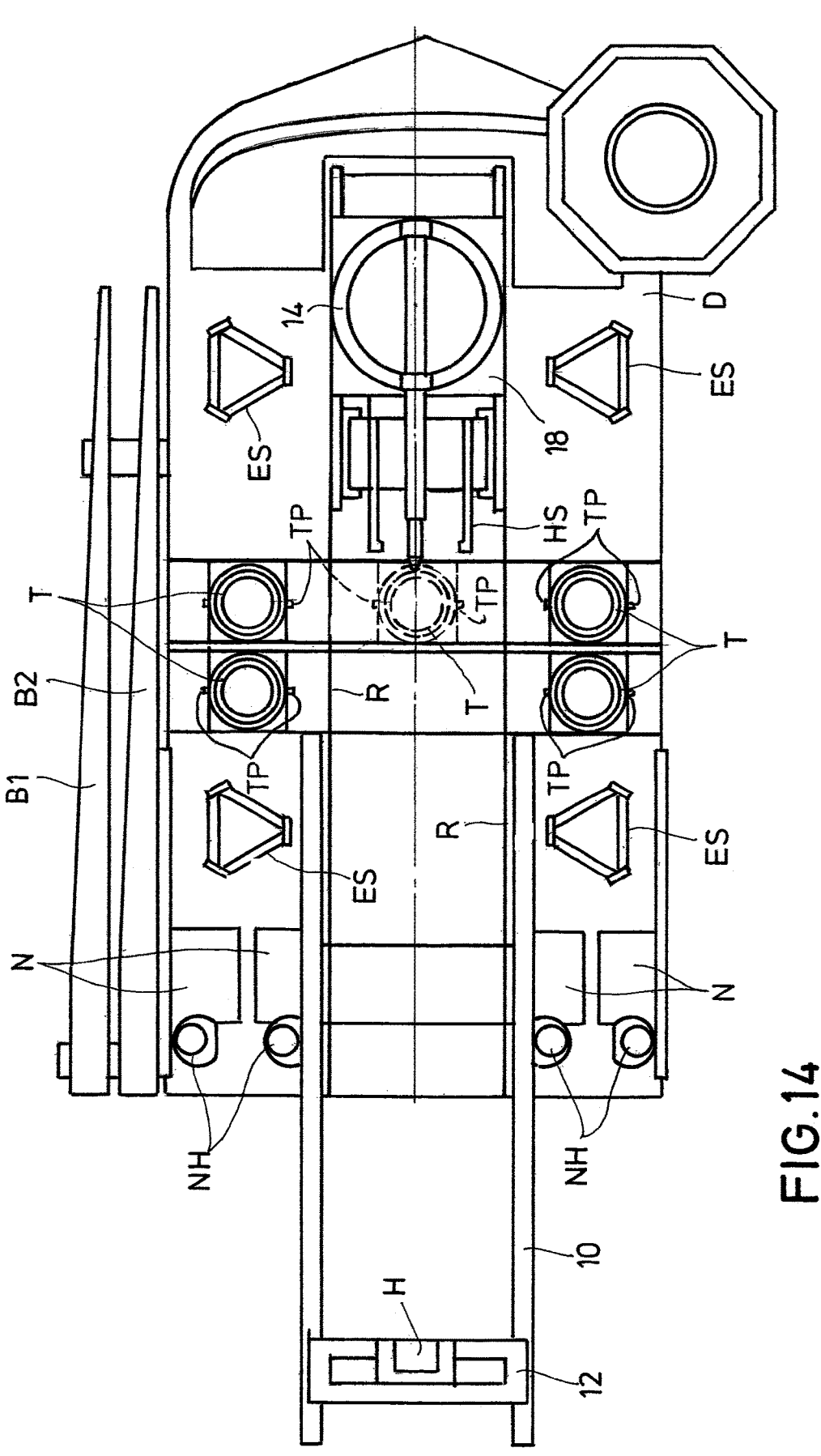
FIG. 14 is a plan view of the combination embodiment of FIG. 13 illustrating the stored position of the assembled 3 tower sections, the nacelle assemblies outboard of the vessel centerline and blades on the outboard racks, further illustrated is a plan view of 4 assembled 3 tower sections movable on skid carts, one assembled tower is shown moved from its outboard position of the vessel centerline to its lifting position along the vessel centerline (as shown in dashed lines) for lifting by the handling system.
Figure 15:
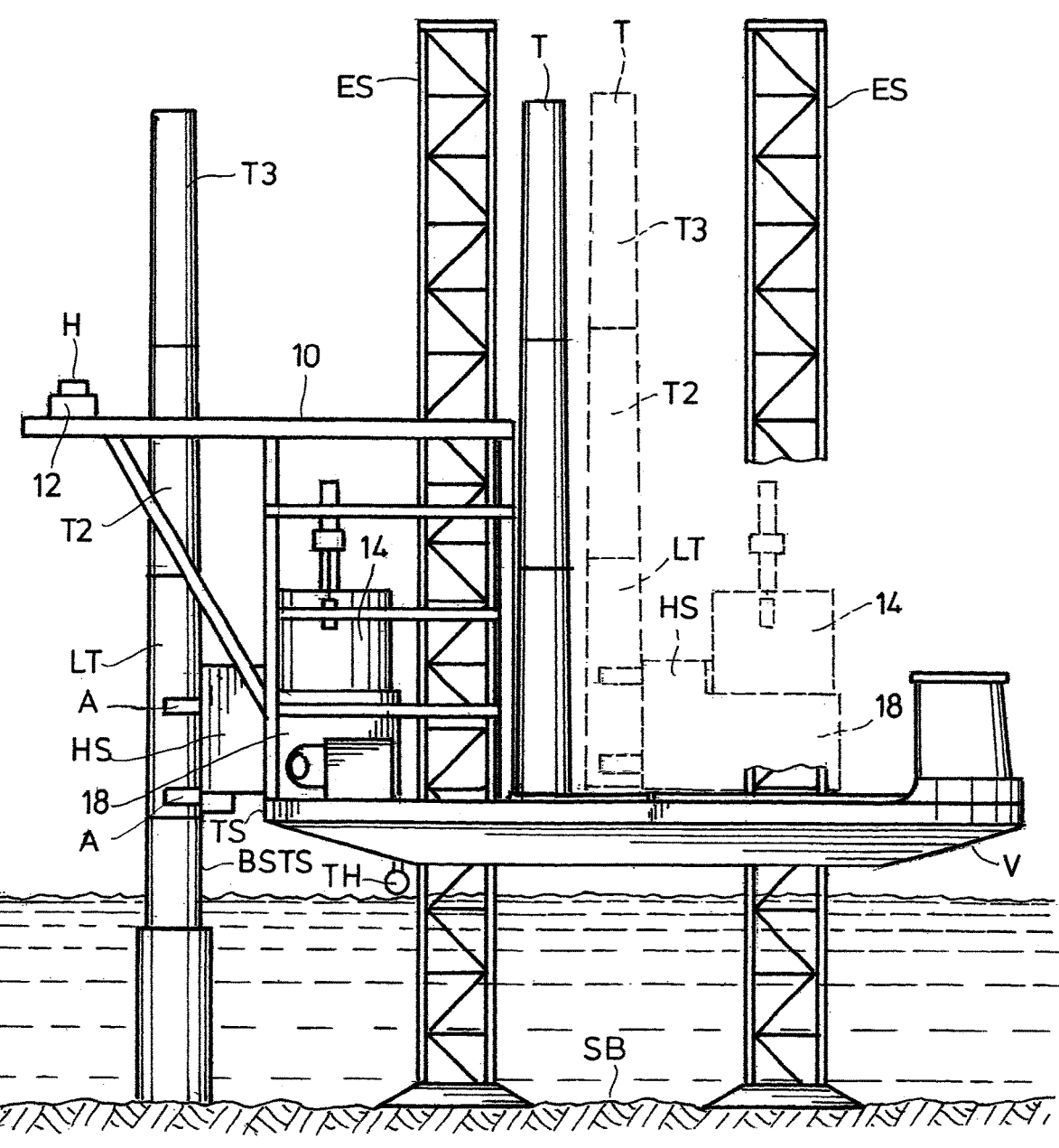
FIG. 15 is a side elevational view, similar to FIGS. 13 and 14, illustrating the handling system moving the assembled tower from the lifting position, as shown in dashed lines in FIG. 14, (the handling system and tower sections shown in dashed lines), along the rails on the vessel deck to the assembled position where the assembled tower is aligned with the seabed bottom supported tower section by the properly elevated handling system (the handling system and tower sections shown in solid lines)
Figure 16:
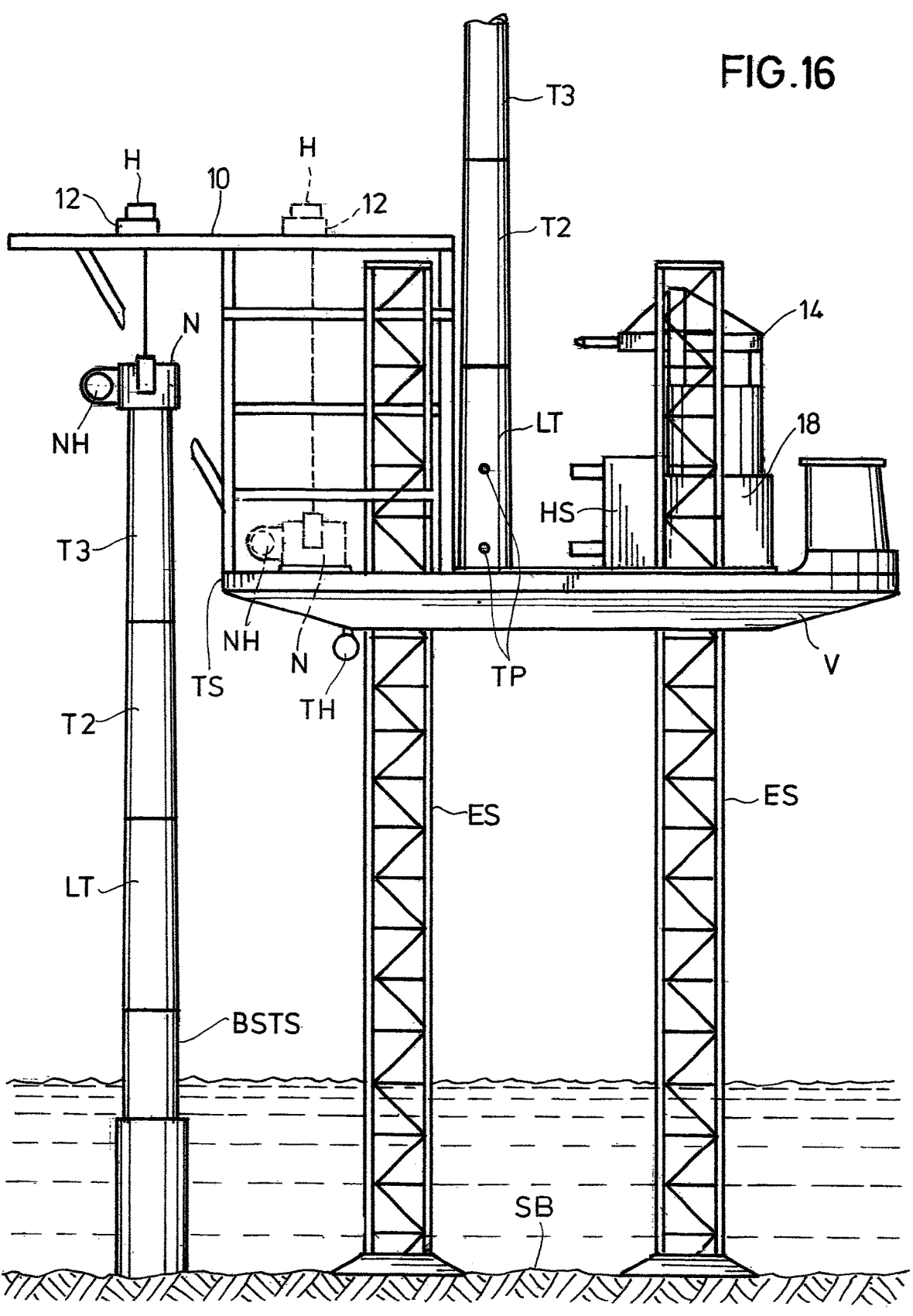
FIG. 16 is a side elevational view, similar to FIGS. 13,14 and 15, illustrating the vessel further elevated from the seabed, further illustrating the bridge crane hoist movable on the gantry structure to move a nacelle assembly from its stored/lifting position (shown in dashed lines) to its assembled position on the assembled tower (as shown in solid lines)
Figure 17:
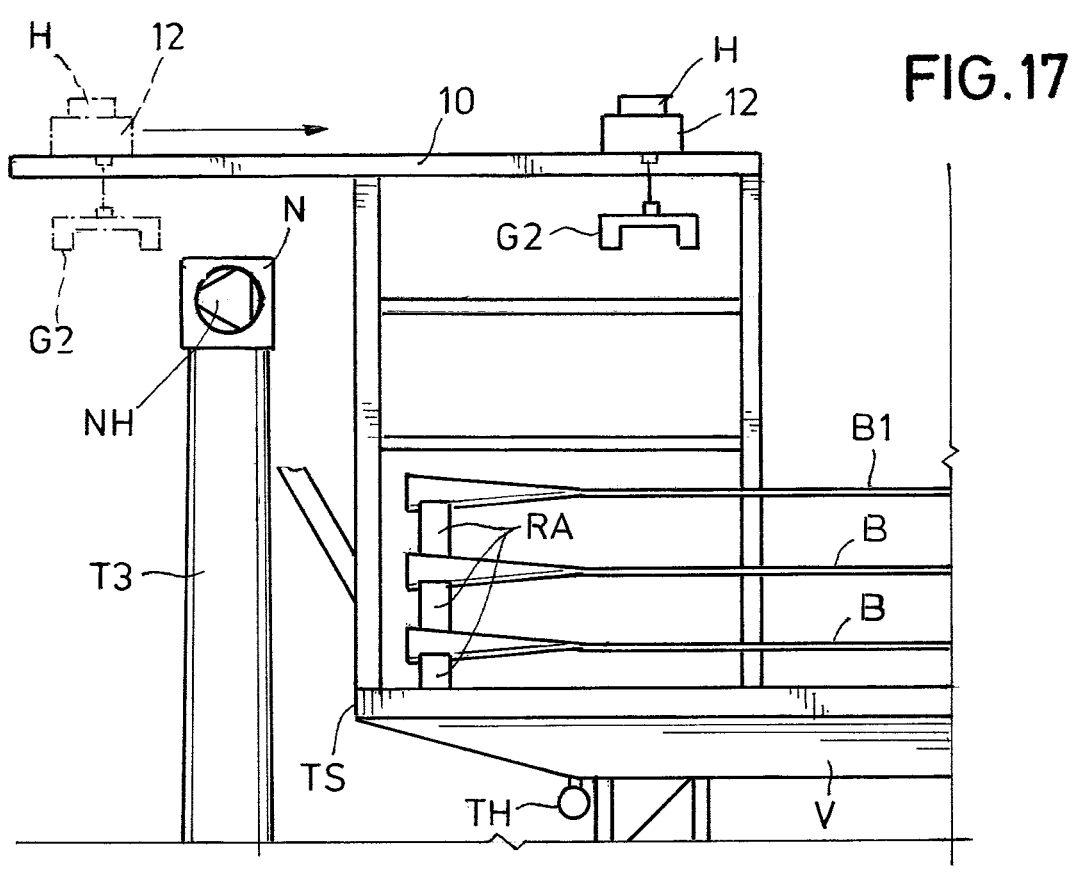
FIG. 17 is a partial side elevational view of the combination embodiment of FIGS. 15 and 16 where, after the nacelle assembly is assembled with an installed tower section, a bridge crane movable on rails is illustrated in dashed lines and moved to a position (in solid lines) to above a wind turbine blade for lifting the wind turbine blades with a blade gripper, similar to FIGS. 4A and 4B.
Figure 18:
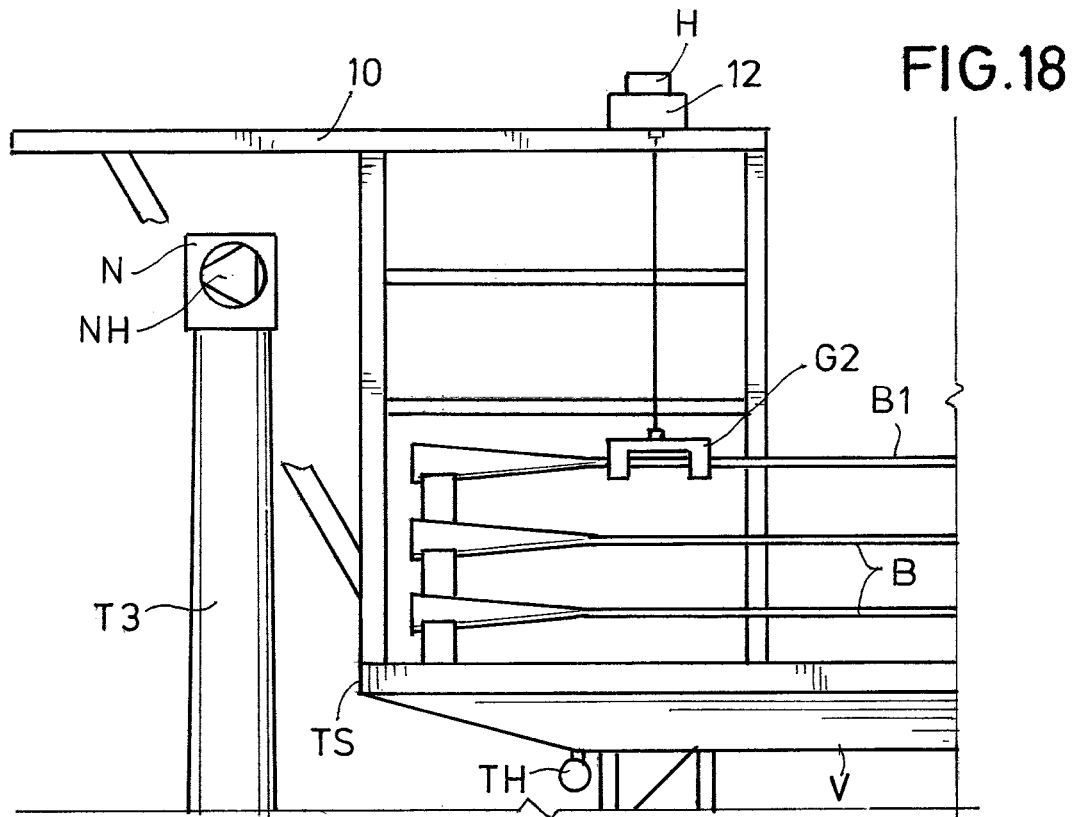
FIG. 18 is a partial side elevational view, similar to FIG. 17, illustrating the hoist lowering the blade gripper for gripping and then lifting the wind turbine blade, similar to FIG. 4A.
Figure 19:
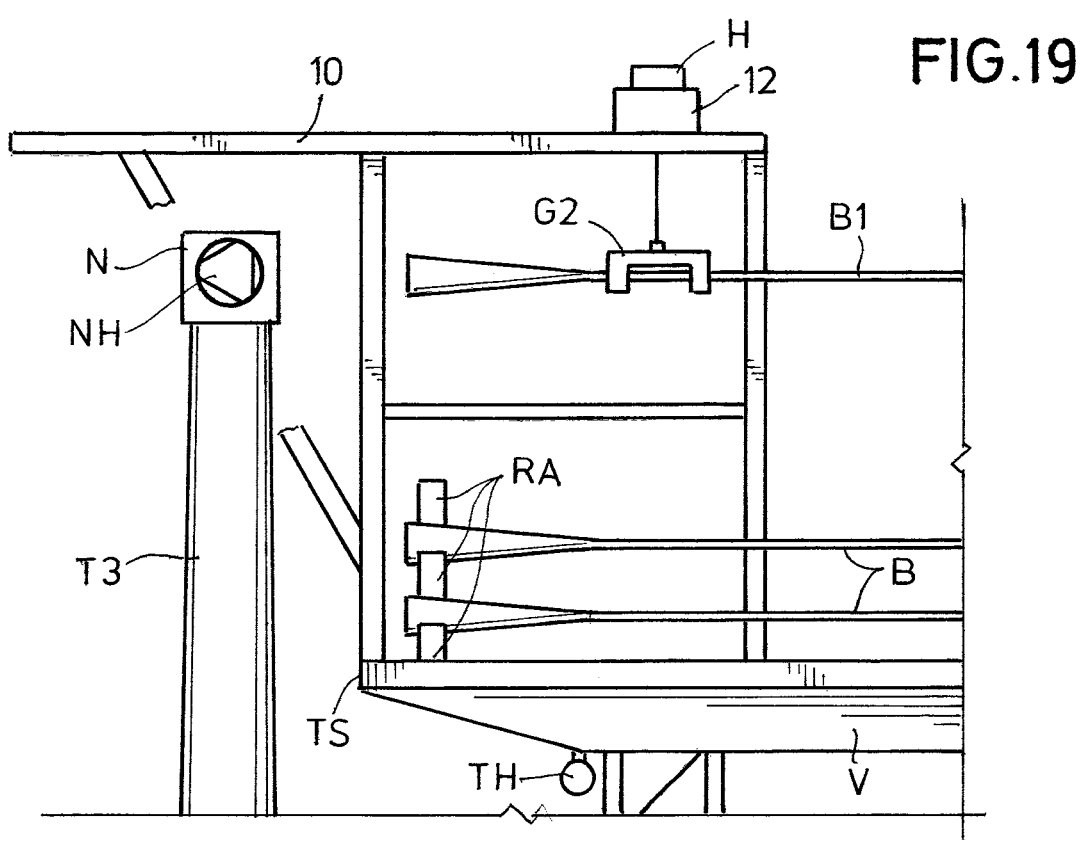
FIG. 19 is a partial side elevational view, similar to FIGS. 17 and 18, illustrating the blade gripper lifting and aligning the wind turbine blade with the nacelle hub, similar to FIG. 4B.
Figure 20:
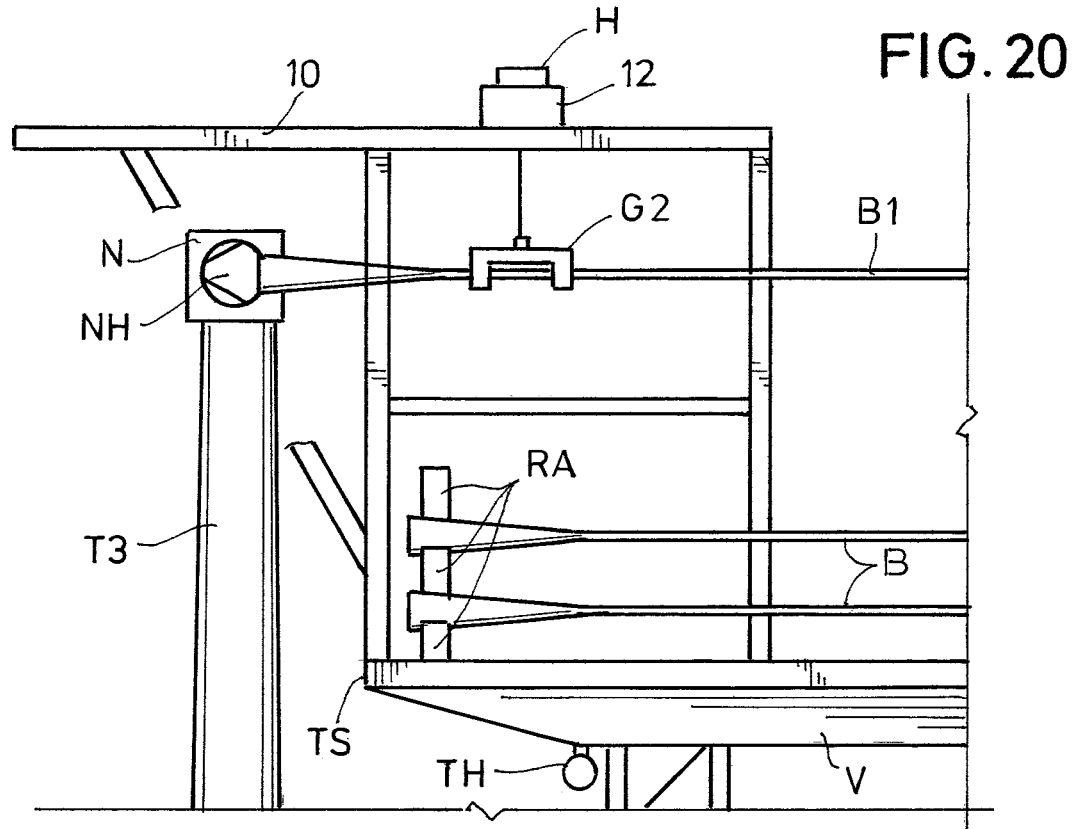
FIG. 20 a partial side elevational view, similar to FIGS. 17 to 19, where the bridge crane move toward the nacelle hub for fastening the blade with the nacelle hub.
Figure 21:
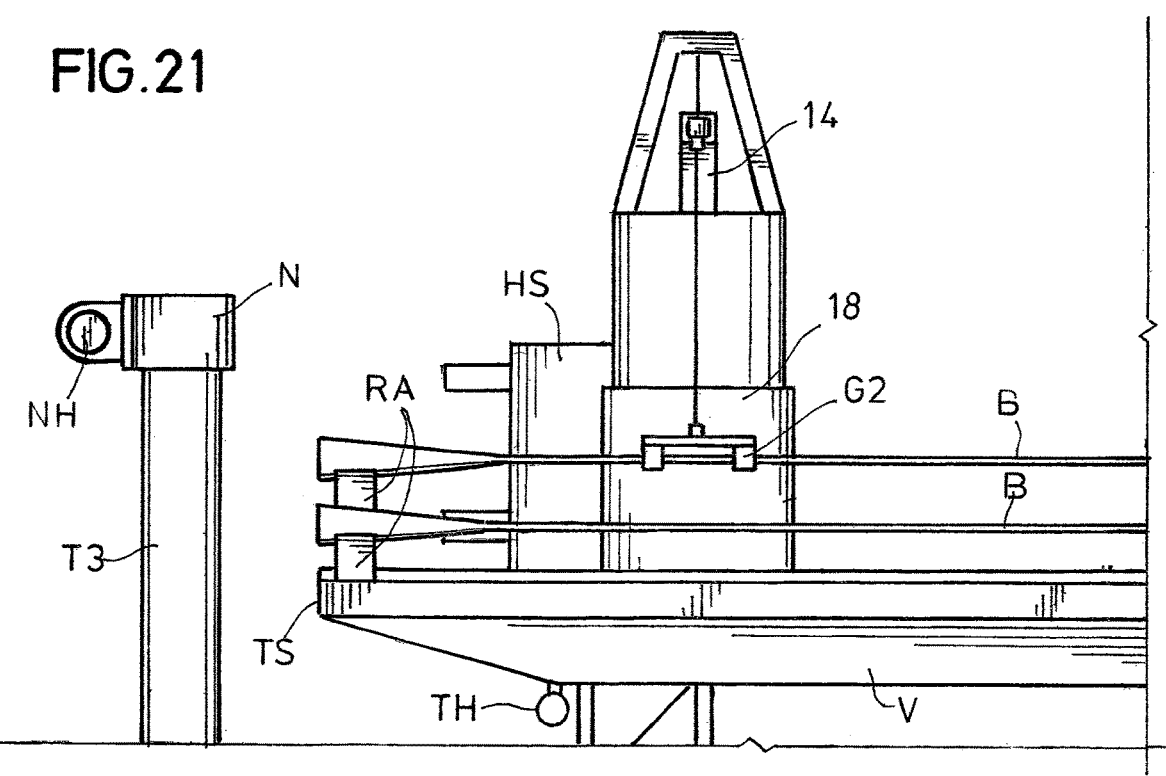
FIG. 21 is a partial side elevational view of the combination embodiment of FIGS. 15 and 16 where, after the nacelle assembly is assembled with an installed tower section, a crane having a boom is illustrated on a skidding structure for lifting a wind turbine blade with a blade gripper, similar to FIG. 10.
Figure 22:
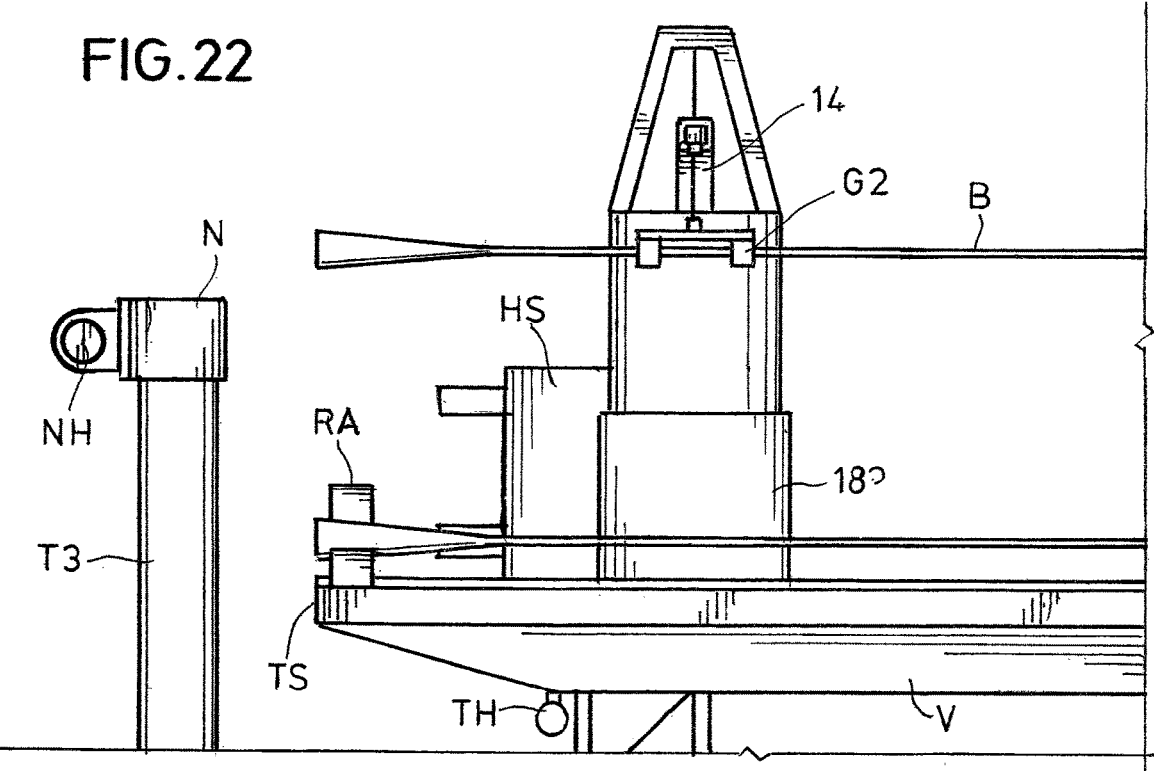
FIG. 22 is a partial side elevational view, similar to FIG. 21, illustrating the hoist lifting the blade gripper for lifting the wind turbine blade.
Figure 23:
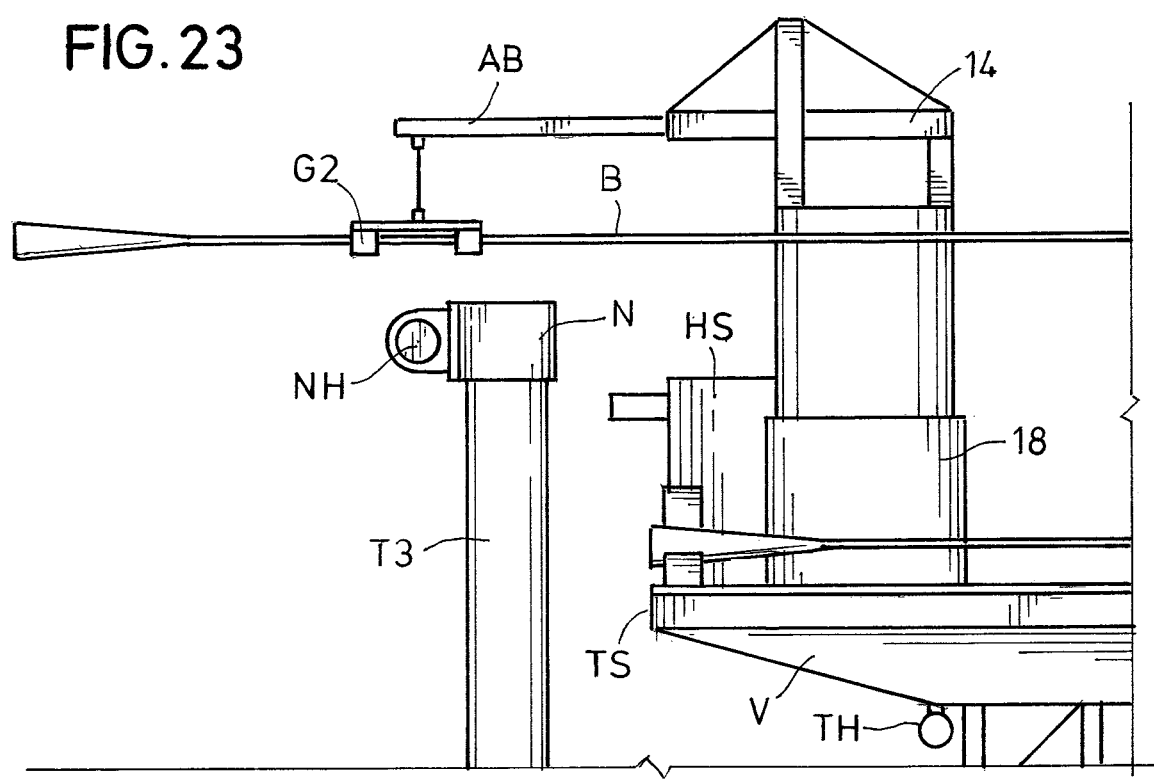
FIG. 23 is a partial side elevational view, similar to FIGS. 21 and 22, illustrating the crane rotated approximately 90° and the skidding structure moved to the transom end of the vessel so the blade gripper can position the wind turbine blade relative to the nacelle hub.
Figure 24:
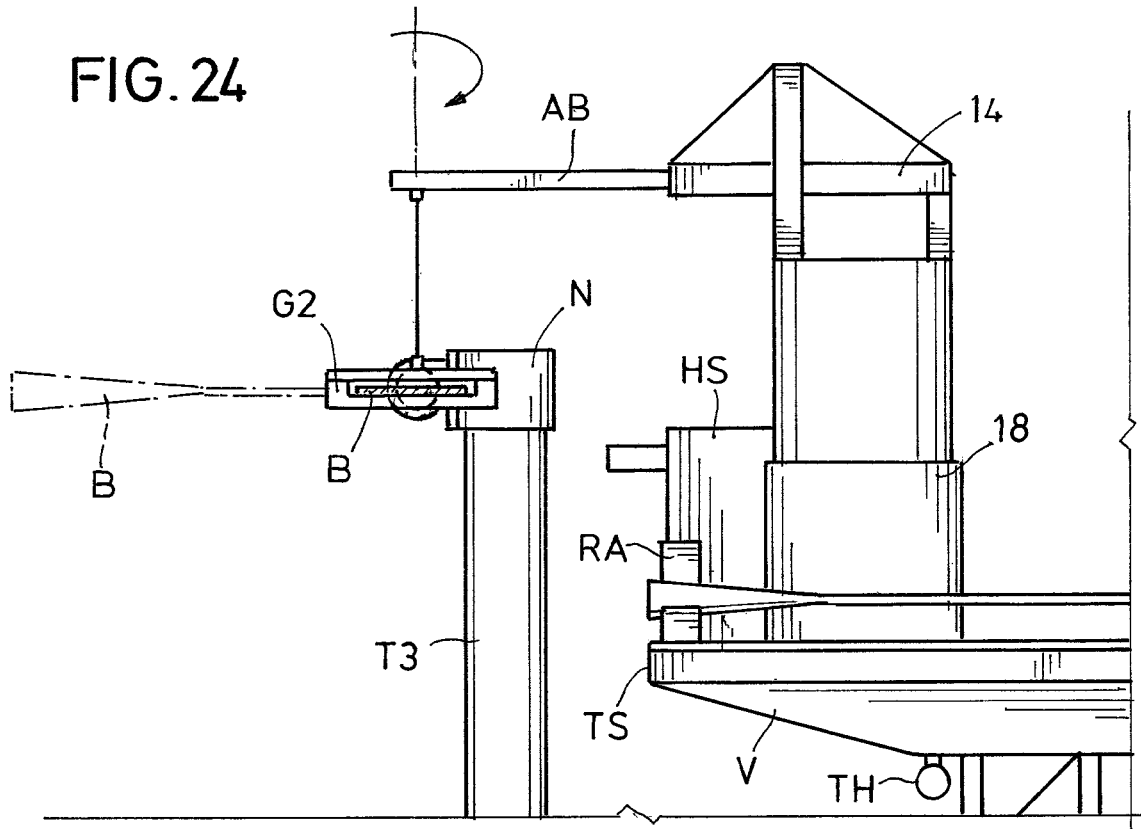
FIG. 24 is a parallel side elevational view, similar to FIG. 23, illustrating the blade gripper rotating the blade, illustrated in solid lines, 90° from the blade, illustrated in dashed lines, and lowered to align the wind turbine blade with the nacelle hub for fastening thereto.

One example of a combination embodiment system and method is shown in FIGS. 13 to 24. As best shown in FIGS. 13 to 15, selected systems and methods from the T.A.P.S. embodiment are contemplated to be used to assemble wind turbine towers or columns T in one or multiple tower sections. (See tower sections LT, T2, T3.) As best shown in FIGS. 14 and 24, a modified version of the T.I.G.S. embodiment is contemplated to be used to raise a nacelle assembly N to a resting platform where 3 wind turbine blades B can be assembled with the hub NH while the nacelle assembly N is still aboard the vessel V. As best shown in FIGS. 13 to 16, the S.T.I.C. embodiment crane 14 is contemplated to be mounted to the T.A.P.S. embodiment cantilever structure 18 to be used instead of or redundant with the modified T.I.G.S. embodiment. As a result, either the T.I.G.S., S.T.I.C. or T.A.P.S. embodiments selected systems and methods can be used to assemble the turbine blades B, which are contemplated to be releasably stored in either suitable racks RA on one side of the vessel V, as best shown in FIG. 14, or along the vessel V centerline C, for example, see FIGS. 2A and 3. For example, as best shown in FIGS. 17 to 20, the T.I.G.S. embodiment gantry structure 10 could be used with hoist H, bridge crane 12 to align and fasten blades to the nacelle hub NH. Alternatively, as best shown in FIGS. 21 to 24, the T.A.P.S. embodiment cantilevered structure 18 and boom crane 14 could be used with the hoist to align and fasten blades to the nacelle hub NH. As best shown in FIGS. 14 and 15, nacelle assemblies N and towers/columns T are contemplated to be releasably stored on the outboard sides of the vessel centerline C on skidding carts SC. As with all 3 disclosed embodiments, the vessel can self-load all tower sections T and other wind turbine components. Using multiple components from the T.I.G.S., S.T.I.C. and T.A.P.S. embodiments not only provides redundancy for assembly and installation of wind turbine components but also allows simultaneous assembly and installation systems and methods of the wind turbine components depending on the configuration of the multiple components from the embodiments described herein.

Other Positioning Systems

All specific systems and methods that relate to each of the T.I.G.S., S.T.I.C. and T.A.P.S. embodiments are previously described herein.

Tower sections or columns T Installation—The T.A.P.S. embodiment can move and position the turbine tower sections or columns T, as best shown in FIGS. 13 to 15.

Nacelle Assembly N—The T.I.G.S., S.T.I.C. or T.A.P.S. embodiments can be used interchangeably to install the nacelle assembly N as described previously herein to provide redundancy.

Blade B installation—The T.I.G.S., S.T.I.C. or T.A.P.S. embodiments can be used interchangeably to assemble blades B onto the nacelle hub NH, onboard the vessel V or on the assembled nacelle N, to provide redundancy.

Importantly, it is contemplated that, if a combination embodiment is used as shown in FIGS. 13 to 24, an assembled one piece tower, as shown in FIGS. 13 to 16, with or without an assembled nacelle N could be fastened to a bottom supported tower section BSTS without the use of a self-leveling and self-elevating jack up rig. Therefore, the present invention is contemplated to be used on a floating vessel, without legs, such as a ship.

The foregoing disclosure and description of the present inventions are illustrative and explanatory thereof, and various changes in the details of the illustrated apparatus and construction and the method of operation may be made without departing from the spirit of the present inventions. Further, the above and other objects, features and advantages of the present inventions should become even more readily apparent to those skilled in the art upon a reading of the detailed description in conjunction with the drawings wherein there is shown and described multiple embodiments of the present invention. Furthermore, it will be apparent to those skilled in the art that various changes may be made without departing from the scope of the present inventions and the present inventions are not be considered limited to what is shown and described in the specification and drawings.

We claim:

1. System configured for installing offshore wind turbine components, comprising a jack up vessel having a self-elevating system operably configured to elevate and lower said vessel relative to a seabed, comprising:

said vessel having a deck for supporting said wind turbine components;

a gantry structure fixedly positioned with said vessel deck so as not to move relative to said deck;

rails positioned with said gantry structure to define a centerline along a longitudinal direction of said vessel, one rail positioned on one side of said centerline and the other rail positioned on the other side of said centerline, a portion of both of said rails being cantilevered over a transom of said vessel;

at least one gripper for gripping said wind turbine components;

at least one hoist configured for use with said gripper for lifting said wind turbine components from said deck; and at least one bridge crane movably positioned on said rails and adapted for use with said hoist, said bridge crane movable relative to said vessel deck between a lifting position for lifting said wind turbine components from said deck and an installing position where said hoist is operably positioned on said cantilevered rails to lower said wind turbine components lifted from said vessel deck without interference with said vessel deck, wherein when said bridge crane moves said wind turbine components, said wind turbine components are suspended from said hoist both below said rails and between said rails and said vessel deck.

2. System of claim 1, wherein said wind turbine components comprise at least one tower section, a first blade, and a nacelle assembly hub, said first blade configured to be lifted by said bridge crane hoist above said vessel deck between said rails to be aligned with said nacelle assembly hub positionable above said tower section for assembling said first blade with said nacelle assembly hub, and further comprising a second blade, wherein the nacelle assembly hub and the assembled first blade are rotated so that the bridge crane hoist can align the second blade between said rails and with the nacelle assembly hub for assembling the second blade with the nacelle assembly hub.

3. System of claim 2, wherein the tower section of the wind turbine components is configured to be positioned above the vessel deck between and below said rails for lifting by said bridge crane hoist.

4. System of claim 1, wherein said bridge crane is movable longitudinally relative to said rails and said hoist is movable laterally relative to said bridge crane to operable position said hoist at said installing position so that said hoist can lower said lifted wind turbine components without interference with said vessel deck.

5. System of claim 1, wherein said gantry structure comprises:
  a first pair of supporting legs provided on said one side of said vessel and said one rail supported by said first pair of supporting legs; and
  a second pair of supporting legs provided on said other side of said vessel and said other rail supported by said second pair of supporting legs, said other rail being substantially parallel to said one rail,
  wherein said bridge crane moves along said rails.

6. System configured for installing offshore wind turbine components, comprising a jack up vessel having a self-elevating system operably configured to elevate and lower said vessel relative to a seabed, comprising:
  said vessel having a deck for supporting said wind turbine components;
  a gantry structure fixedly positioned with said vessel deck so as not to move relative to said deck;
  rails positioned with said gantry structure to define a centerline along a longitudinal direction of said vessel, one rail positioned on one side of said centerline and the other rail positioned on the other side of said centerline, a portion of both of said rails being cantilevered over a transom of said vessel;
  at least one gripper for gripping said wind turbine components;
  at least one hoist configured for use with said gripper for lifting said wind turbine components from said deck; and
  at least one bridge crane movably positioned on said rails and adapted for use with said hoist, said bridge crane movable relative to said vessel deck between a lifting position for lifting said wind turbine components from said deck and an installing position where said hoist is operably positioned on said cantilevered rails to lower said wind turbine components lifted from said vessel deck without interference with said vessel deck, wherein when said bridge crane moves said wind turbine components, said wind turbine components are suspended from said hoist both below said rails and between said rails and said vessel deck, wherein said gantry structure comprises:
  a first pair of supporting legs provided on said one side of said vessel and said one rail supported by said first pair of supporting legs; and
  a second pair of supporting legs provided on said other side of said vessel and said other rail supported by said second pair of supporting legs, said other rail being substantially parallel to said one rail,
  wherein said bridge crane moves along said rails.

7. System of claim 6, wherein said wind turbine components comprise at least one tower section, a first blade, and a nacelle assembly hub, said first blade configured to be lifted by said bridge crane hoist above said vessel deck between said rails to be aligned with said nacelle assembly hub positionable above said tower section for assembling said first blade with said nacelle assembly hub, and further comprising a second blade, wherein the nacelle assembly hub and the assembled first blade are rotated so that the bridge crane hoist can align the second blade between said rails and with the nacelle assembly hub for assembling the second blade with the nacelle assembly hub.

8. System of claim 7, wherein the tower section of the wind turbine components is configured to be positioned above the vessel deck between and below said rails for lifting by said bridge crane hoist.

9. System of claim 6, wherein said bridge crane is movable longitudinally relative to said rails and said hoist is movable laterally relative to said bridge crane to operable position said hoist at said installing position so that said hoist can lower said lifted wind turbine components without interference with said vessel deck.

10. System configured for installing offshore wind turbine components, comprising a self-elevating vessel operably configured to elevate and lower said vessel relative to a seabed, comprising:
  said vessel having a deck for supporting said wind turbine components;
  a gantry structure positioned with said vessel deck so as not to move relative to said deck;
  rails positioned with said gantry structure along a longitudinal direction of said vessel, one rail positioned on one side of said deck and the other rail positioned on the other side of said deck, a portion of both of said rails being cantilevered from said self-elevating vessel;
  at least one gripper for gripping said wind turbine components;
  at least one hoist configured for use with said gripper for lifting said wind turbine components from said deck; and
  at least one bridge crane movably positioned on said rails and adapted for use with said hoist, said bridge crane movable relative to said vessel deck between a lifting position for lifting said wind turbine components from said deck and an installing position where said hoist is operably positioned on said cantilevered rails to lower said wind turbine components lifted from said vessel deck without interference with said vessel deck, wherein when said bridge crane moves said wind turbine components, said wind turbine components are suspended from said hoist.

11. System of claim 10, wherein said wind turbine components comprise at least one tower section, a first blade, and a nacelle assembly hub, said first blade configured to be lifted by said bridge crane hoist above said vessel deck between said rails to be aligned with said nacelle assembly hub positioned above said tower section for assembling said first blade with said nacelle assembly hub.

12. System of claim 11, wherein the tower section is configured to be positioned above the vessel deck between and below said rails for lifting by said bridge crane hoist.

13. System of claim 10, wherein said bridge crane is movable longitudinally relative to said rails and said hoist is movable laterally relative to said bridge crane to operable position said hoist at said installing position so that said hoist can lower said lifted wind turbine components without interference with said vessel deck.

14. System of claim 10, wherein said gantry structure comprises:

a first pair of supporting legs provided on said one side of said vessel and said one rail supported by said first pair of supporting legs; and a second pair of supporting legs provided on said other side of said vessel and said other rail supported by said second pair of supporting legs, said other rail being substantially parallel to said one rail, wherein said bridge crane moves along said rails.

15. System configured for installing offshore wind turbine components, comprising a self-elevating vessel configured to elevate and lower said vessel relative to a seabed, comprising:

said vessel having a deck for supporting said wind turbine components;

a gantry structure positioned with said vessel deck;

rails positioned with said gantry structure along a longitudinal direction of said vessel, one rail positioned on one side of said deck and the other rail positioned on the other side of said deck, a portion of both of said rails being cantilevered from said vessel;

at least one gripper for gripping said wind turbine components;

at least one hoist configured for use with said gripper for lifting said wind turbine components from said deck; and at least one bridge crane movably positioned on said rails and adapted for use with said hoist, said bridge crane movable relative to said vessel deck between a lifting position for lifting said wind turbine components from said deck and an installing position where said hoist is operably positioned on said cantilevered rails to lower said wind turbine components lifted from said vessel deck without interference with said vessel deck, wherein when said bridge crane moves said wind turbine components, said wind turbine components are suspended from said hoist, wherein said gantry structure comprises:

a first pair of supporting legs provided on said vessel and said one rail supported by said first pair of supporting legs; and a second pair of supporting legs provided on said vessel and said other rail supported by said second pair of supporting legs, said other rail being substantially parallel to said one rail, wherein said bridge crane moves along said rails.

16. System of claim 15, wherein said wind turbine components comprise at least one tower section, a first blade, and a nacelle assembly hub, said first blade configured to be lifted by said bridge crane hoist above said vessel deck between said rails to be aligned with said nacelle assembly hub positioned above said tower section for assembling said first blade with said nacelle assembly hub.

17. System of claim 16, wherein the tower section is configured to be positioned above the vessel deck between and below said rails for lifting by said bridge crane hoist.

18. System of claim 15, wherein said bridge crane is movable longitudinally relative to said rails and said hoist is movable laterally relative to said bridge crane to operable position said hoist at said installing position so that said hoist can lower said lifted wind turbine components without interference with said vessel deck.

19. System configured for installing an offshore wind turbine component, comprising a jack up vessel having a self-elevating system operably configured to elevate and lower said vessel relative to a seabed, comprising:

said vessel having a deck for supporting said wind turbine component;

a gantry structure positioned with said vessel deck so as not to move relative to said deck;

rails positioned with said gantry structure along a longitudinal direction of said vessel, one rail positioned on one side of said vessel and the other rail positioned on the other side of said vessel, a portion of both of said rails being cantilevered over a side of said vessel;

at least one hoist configured for lifting said wind turbine component from said deck; and at least one bridge crane movably positioned on said rails and adapted for use with said hoist, said bridge crane movable relative to said vessel deck between a lifting position for lifting said wind turbine component from said deck and an installing position where said hoist is operably positioned on said cantilevered rails to lower said wind turbine component lifted from said vessel deck without interference with said vessel deck, wherein when said bridge crane moves said wind turbine component, said wind turbine component is suspended from said hoist both below said rails and between said rails and said vessel deck, wherein said gantry structure comprises:

a first pair of supporting legs provided on said one side of said vessel and said one rail supported by said first pair of supporting legs; and a second pair of supporting legs provided on said other side of said vessel and said other rail supported by said second pair of supporting legs, said other rail being substantially parallel to said one rail.

20. System of claim 19, wherein a plurality of wind turbine components are supported on said vessel deck, wherein said wind turbine components comprise at least one tower section, a first blade, and a nacelle assembly hub, said first blade configured to be lifted by said bridge crane hoist above said vessel deck between said rails to be aligned with said nacelle assembly hub positionable above said tower section for assembling said first blade with said nacelle assembly hub, and further comprising a second blade, wherein the nacelle assembly hub and the assembled first blade are rotated so that the bridge crane hoist can align the second blade between said rails and with the nacelle assembly hub for assembling the second blade with the nacelle assembly hub.

21. System of claim 20, wherein said tower section of said wind turbine components is configured to be positioned above said deck between and below said rails for lifting by said hoist.

22. System of claim 20, wherein said wind turbine components further comprise a nacelle assembly, wherein said nacelle assembly is configured to be movable from outboard of said vessel to between and below said rails for lifting of said nacelle assembly by said hoist.

23. System of claim 19, wherein said bridge crane is movable longitudinally relative to said rails and said hoist is movable laterally relative to said bridge crane to operably position said hoist at said installing position so that said hoist can lower said lifted wind turbine components without interference with said deck.

* * * * *